US011863929B2

(12) United States Patent
Everman et al.

(10) Patent No.: US 11,863,929 B2
(45) **Date of Patent: *Jan. 2, 2024**

(54) SYSTEMS AND METHODS FOR DYNAMIC NOISE REDUCTION

(71) Applicant: GMECI, LLC, Beavercreek, OH (US)

(72) Inventors: Bradford R. Everman, Haddonfield, NJ (US); Brian Scott Bradke, Brookfield, VT (US)

(73) Assignee: GMECI, LLC, Beavercreek, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,893

(22) Filed: Jan. 6, 2023

(65) Prior Publication Data

US 2023/0145231 A1 May 11, 2023

Related U.S. Application Data

(63) Continuation of application No. 17/333,267, filed on May 28, 2021, now Pat. No. 11,595,749.

(51) Int. Cl.
*H04R 1/10* (2006.01)
*G10K 11/178* (2006.01)
*H04R 1/02* (2006.01)

(52) U.S. Cl.
CPC ..... *H04R 1/1091* (2013.01); *G10K 11/17823* (2018.01); *G10K 11/17827* (2018.01); *H04R 1/028* (2013.01); *H04R 1/1083* (2013.01); *H04R 2460/01* (2013.01)

(58) Field of Classification Search
CPC .... H04R 1/1091; H04R 1/028; H04R 1/1083; H04R 2460/01; G10K 11/17823; G10K 11/17827
See application file for complete search history.

(56) References Cited

U.S. PATENT DOCUMENTS

| | | | |
|---|---|---|---|
| 8,652,040 | B2 | 2/2014 | Leboeuf et al. |
| 9,414,150 | B2 | 8/2016 | Hendrix et al. |
| 10,405,081 | B2 | 9/2019 | Hviid et al. |
| 10,701,470 | B2 | 6/2020 | Schrader et al. |
| 10,706,868 | B2 | 7/2020 | Jhawar et al. |

(Continued)

FOREIGN PATENT DOCUMENTS

WO 2021061754 4/2021

OTHER PUBLICATIONS

Sen M. Kuo, Sohini Mitra, and Woon-Seng Gan, Active Noise Control System for Headphone Applications, Mar. 1, 2006.

*Primary Examiner* — Jason R Kurr
(74) *Attorney, Agent, or Firm* — Caldwell Intellectual Property Law

(57) ABSTRACT

Aspects relate to systems and methods for dynamic active noise reduction including at least a sensor configured to sense a physiological characteristic of a user and transmit a physiological signal correlated to the sensed physiological characteristic, at least an environmental microphone configured to transduce an environmental noise to an environmental noise signal, a processor configured to receive the environmental noise signal, generate a noise-reducing sound signal as a function of the environmental noise signal, and, modify the noise-reducing sound signal as a function of the physiological signal, and a speaker configured to transduce a noise-reducing sound from the modified noise-reducing sound signal.

20 Claims, 11 Drawing Sheets

(56) References Cited

U.S. PATENT DOCUMENTS

| | | | | |
|---|---|---|---|---|
| 10,848,848 | B2 | 11/2020 | Stockton, X et al. | |
| 10,937,407 | B2 | 3/2021 | Goldstein | |
| 11,620,977 | B2 * | 4/2023 | Birmingham ........ | H04R 1/1016<br>381/71.6 |
| 2014/0126733 | A1 | 5/2014 | Gauger, Jr. et al. | |
| 2017/0318374 | A1 | 11/2017 | Dolenc et al. | |
| 2018/0014113 | A1 * | 1/2018 | Boesen ................ | A61B 5/4866 |
| 2019/0346934 | A1 | 11/2019 | Schrader et al. | |
| 2020/0029881 | A1 | 1/2020 | Flood et al. | |
| 2020/0380945 | A1 | 12/2020 | Woodruff et al. | |
| 2021/0014610 | A1 | 1/2021 | Carrigan et al. | |
| 2021/0026449 | A1 | 1/2021 | Chan et al. | |
| 2021/0099787 | A1 | 4/2021 | Yang et al. | |

* cited by examiner

SYSTEMS AND METHODS FOR DYNAMIC NOISE REDUCTION

CROSS-REFERENCE TO RELATED APPLICATIONS

This application is a continuation-in-part of Non-provisional application Ser. No. 17/333,267 filed on May 28, 2021 and entitled "SYSTEMS AND METHODS FOR DYNAMIC NOISE REDUCTION," the entirety of which is incorporated herein by reference.

FIELD OF THE INVENTION

The present invention generally relates to the field of audio signal processing. In particular, the present invention is directed to a systems and methods for dynamic noise reduction.

BACKGROUND

Active noise cancelling technology has been known for almost 100 years. In the past 20 years active noise cancelling technology became available in headphones to the general consumer. This technology cancels out environmental sound with an antiphase sound by way of destructive interference. Typically, noise cancelling headphone use result in the user experiencing nothing but silence. Silence may be good for a long transatlantic flight but experiencing most of life's activities in silence is nonideal, uncanny, and at times even dangerous.

SUMMARY OF THE DISCLOSURE

In an aspect, a system for dynamic active noise reduction includes at least a physiological sensor configured to sense a physiological characteristic of a user and transmit a physiological signal correlated to the sensed physiological characteristic. The system also including at least an environmental microphone configured to transduce an environmental noise to an environmental noise signal. The system also including a processor configured to receive the environmental noise signal, correlate at least a component of the environmental noise signal to a physiological parameter of a plurality of physiological parameters of the user, wherein the physiological parameter includes an arousal response, generate a noise-reducing sound signal as a function of the environmental noise signal, and modify the noise-reducing sound signal as a function of the physiological signal and the arousal response, wherein modifying the noise reducing sound signal includes modifying the noise-reducing sound signal to selectively pass through an impulsive sound of the environmental noise. The system also including a speaker configured to transduce a noise-reducing sound from the modified noise-reducing sound signal.

In another aspect, a method of dynamic active noise reduction, the method including sensing, using at least a physiological sensor, a physiological characteristic of a user. The method also including transmitting, using the at least a physiological sensor, a physiological signal correlated to the sensed physiological characteristic. The method also including transducing, using at least an environmental microphone, an environmental noise to an environmental noise signal. The method also including receiving, using a processor, the environmental noise signal. The method also including correlating, using the processor, at least a component of the environmental noise signal to a physiological parameter of a plurality of physiological parameters of the user, wherein the physiological parameter includes an arousal response. The method also including generating, using the processor, a noise-reducing sound signal as a function of the environmental noise signal. The method also including modifying, using the processor, the noise-reducing sound signal as a function of the physiological signal and the arousal response, wherein modifying the noise reducing sound signal includes modifying the noise-reducing sound signal to selectively pass through an impulsive sound of the environmental noise. The method also including transducing, using a speaker, a noise-reducing sound from the modified noise-reducing sound signal.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for dynamic active noise reduction. In an embodiment, dynamic active noise reduction may be controlled as a function of a user's physiological state. A user's physiological state may be determined by at least a physiological sensor configured to sense and transmit at least a physiological signal indicative of at least a physiological characteristic or parameter, for example without limitation heart rate, cranial blood oxygenation, and the like.

Aspects of the present disclosure can be used to control active noise cancellation based at least in part upon a physiological characteristic of a user. Aspects of the present disclosure can also be used to affect a physiological characteristic of a user in a predictable manner through control of active noise cancellation. This is so, at least in part, because environmental noise, and sounds more generally, are known to affect physiological states of humans and animals. As a non-limiting example, many people find white-noise calming, relaxing, or even sleep inducing. Conversely, unexpected impulsive noises are generally arousing in all animals.

Aspects of the present disclosure allow for control and modulation of active noise cancellation to affect physiological state of a user. Exemplary embodiments illustrating aspects of the present disclosure are described below in the context of several specific examples.

Figure 1:
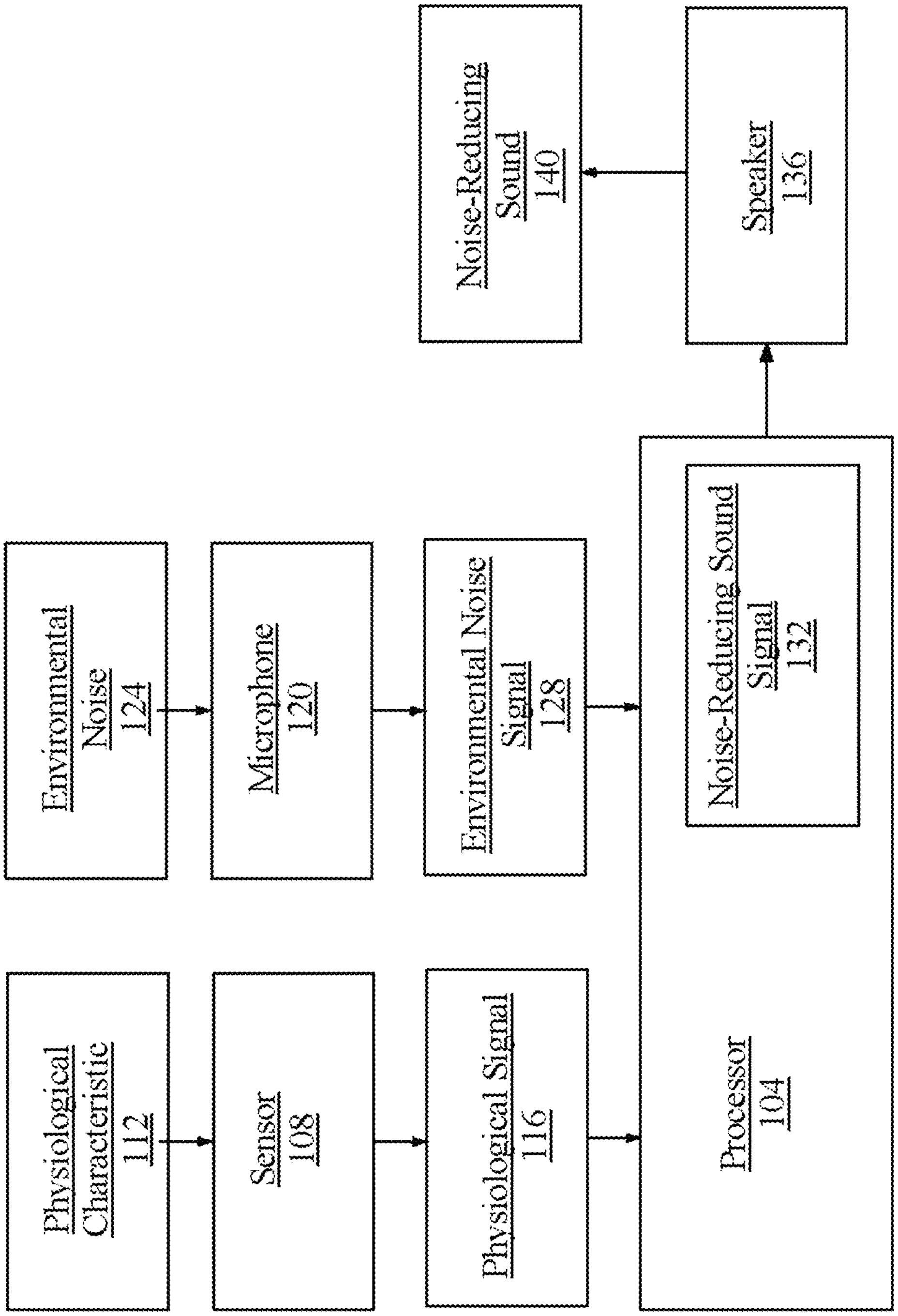
FIG. 1 is a block diagram illustrating an exemplary system for dynamic active noise reduction.

Referring now to FIG. 1, an exemplary embodiment of an exemplary system 100 dynamic active noise reduction is illustrated. System includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of system 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing with reference to FIG. 1, system 100 may include at least a sensor 108. Sensor 108 may be configured to sense (i.e., detect) a physiological characteristic 112 of a person, such as a user of system 100. Sensor 108 may include any sensor configurable to sense a physiological characteristic (i.e., parameter), for instance sensors described in this disclosure; and physiological characteristic 112 may include any physiological characteristic of a person, for instance physiological characteristics described in this disclosure. A physiological characteristic may include an hematological characteristic, a respiratory characteristic, ocular characteristics, vocal characteristics, and/or a cardiac characteristic. A hematological characteristic, in some cases, may include blood-oxygen content, for example without limitation cranial blood oxygen content. A respiratory characteristic may include, in some cases, respiration rate or volume, or expirate content, for example without limitation $CO_2$ exhalation content. Ocular characteristics, in some cases, may include eye position, dilation, and the like. In some cases, vocal characteristics include voice tone, register, timber, cadence, and the like. In some cases, cardiac characteristic may include heart rate and/or cardiac output. Exemplary non-limiting sensors 108 and physiological characteristics 112 may include: NIR spectroscopy sensors measuring cranial blood oxygenation; plethysmographic sensors measuring pulse rate and/or blood oxygen level; end-tidal $CO_2$ sensors measuring respiration rate and/or $CO_2$ levels; respiration volumetric flow rate sensors measuring respiration flow; camera and/or electromyography sensors measuring eye tracking and blink movements; and/or, microphone (e.g., bone conductance microphone) measuring speech/breath cadence and/or tone. Sensor 108 may be configured to transmit a physiological signal 116 correlated to sensed physiological characteristic 112. In some cases, physiological signal 116 may be correlated to physiological characteristic 112 by way of any of transduction, amplification, measurement, sensing, detection, and the like. In some cases, physiological signal 116 may be based on physiological characteristic 112. Physiological signal 116 may include any signal described in this disclosure, including without limitation electronic, electromagnetic, digital, pneumatic, hydraulic, optical, and the like. Physiological signal 116 may include an analog signal or a digital signal. Physiological signal 116 may be transmitted by any communication methods, for instance those described in this disclosure. For instance, Physiological signal may be communicated by way of a digital serial communication protocol, such as without limitation universal serial bus (USB) or ethernet. Alternatively or additionally, physiological signal 116 may be analog and may be transmitted by one or more analog circuits.

Continuing in reference to FIG. 1, system 100 includes a microphone 120. As used in this disclosure, a "microphone" is any transducer configured to transduce pressure changes to a signal. Microphone 120, according to some embodiments, may include a transducer configured to convert sound into electrical signal. Microphone may be configured to transduce an environmental noise 124 to an environmental noise signal 128. Exemplary non-limiting microphones include dynamic microphones (which may include a coil of wire suspended in a magnetic field), condenser microphones (which may include a vibrating diaphragm condensing plate), and a contact (or conductance) microphone (which may include piezoelectric crystal material). Microphone 120 may include any microphone for transducing pressure changes, as described above; therefore, microphone 120 may include any variety of microphone, including any of: condenser microphones, electret microphones, dynamic microphones, ribbon microphones, carbon microphones, piezoelectric microphones, fiber-optic microphones, laser microphones, liquid microphones, microelectromechanical systems (MEMS) microphones, and/or a speaker microphone. In some cases, environmental noise may include any of background noise, ambient noise, aural noise, such as noise heard by a user's ear, and the like. Additionally or alternatively, in some embodiments, environmental noise may include any noise present in an environment, such as without limitation an environment surrounding, proximal to, or of interest/disinterest to a user. Environmental noise may, in some cases, include substantially continuous noises, such as a drone of an engine. Alternatively or additionally, in some cases, environmental noise may include substantially non-continuous noises, such as spoken communication or a backfire of an engine. Environmental noise signal 128 may include any type of signal, for instance types of signals described in this disclosure. For instance, an environmental noise signal 128 may include a digital signal or an analog signal.

With continued reference to FIG. 1, processor 104 may be configured to receive environmental noise signal 128. Processor 104 may receive environmental noise signal 128 according to any communication method, for instance communication methods described in this disclosure. Processor 104 may generate a noise-reducing sound signal 132 as a function of environmental noise signal 128. As used in this disclosure, a "noise-reducing sound signal" is a sound signal that is configured to generate a noise-reducing sound. Speaker 136, in some embodiments, may be configured to generate a noise-reducing sound 140, as a function of noise-reducing sound signal 132. As used in this disclosure, a "noise-reducing sound" is sound that at least partially destructively interferes with another sound, for example an environmental noise 124. According to some embodiments, processor 104 generates noise-reducing sound signal 132 in order to introduce a noise-reducing sound 140 thereby resulting in active noise cancelling (ANC) and/or active noise reduction (ANR). Processor 104 may generate noise-reducing sound signal 132 by processing environmental sound signal 128 using analog or digital signal processing techniques. For instance according to some embodiments, environmental noise signal 128 includes environmental soundwaves that represent at least a component of environmental noise 124 and processor 104 generates noise-reducing sound signal 132 at least in part by generating antiphase soundwaves that are out of phase with the environmental soundwaves. When speaker generates a noise-reducing sound that includes an antiphase soundwave, the antiphase soundwave destructively interferes with an environmental soundwave, thereby reducing sound of the environmental soundwave. In some cases, an environmental may be taken in by a receiver 120 and reproduced by a reproducing apparatus in the form of sounds having an opposite phase (noise-reducing sound 140). Means of carrying out said processes may consist of an electrical apparatus and where reception is effected by a microphone 120. Microphone 120 may be used to transform and/or transduce acoustic oscillations 124 into electric oscillations 128. Microphone 120 may be connected over an amplifier with a reproducing apparatus 136 (loudspeaker). In some cases, phase opposition can be effected by several means. In case for instance of only one single tune moving in one well defined direction, phase opposition can be effected in a very simple manner by adjusting a distance between microphone 120 and producing apparatus 136. In this case, microphone 120 may be placed between a sound source and a reproducing apparatus 136, causing sound oscillations 124 to meet first the microphone 120 and then the reproducing apparatus 136. Consequently, in some cases, two different kinds of oscillations are present in the reproducing apparatus 136, the one representing the sound oscillation of the tune 124, moving with normal sound velocity, the other 140 representing a wave advanced with respect to the first wave by electrical means between the microphone and the reproducing apparatus and reproduced by the reproducing apparatus. Phase opposition can be effected by suitably adjusting a distance between microphone 120 and reproducing apparatus 136. In order to silence acoustic vibrations of any shape within a. certain range, microphone 120 and loudspeaker 136 may be suitably placed close to each other in such a way that the oscillations coming from a certain point will meet the microphone 120 and the loudspeaker 136 at substantially the same time.

With continued reference to FIG. 1, Speaker 136 may be understood as acting in a manner opposite of microphone. In some embodiments, speaker may be a transducer configured to convert noise-reducing sound signal 132 into noise-reducing sound 140. Speaker 136 may be an electroacoustic transducer that converts an electrical audio signal into a corresponding sound. Speaker 13 may include any variety of speaker including, but not limited to dynamic speakers. A dynamic speaker may operate on according to a same basic principle as a dynamic microphone, but in reverse, to produce sound from an electrical signal. When a signal (e.g., an alternating current electrical audio signal) is applied to a dynamic speaker's voice coil, the voice coil is driven rapidly back and forth due to Faraday's law of induction. A voice coil may include a coil of wire suspended in a circular gap between the poles of a permanent magnet. Voice coil's rapid movements may cause a diaphragm (e.g., a conically shaped diaphragm) attached to the voice coil to move back and forth, as well. Movement of diaphragm may push air proximal the diaphragm thereby creating sound waves. In some cases, a speaker may include multiple speakers, referred to as drivers. Drivers made for reproducing high audio frequencies may be referred to as tweeters, those for middle frequencies are called mid-range drivers, and those for low frequencies may be called woofers. Extremely low frequencies (e.g., between about 16 Hz and about 100 Hz) may be reproduced by separate subwoofers physically independent from speaker, for example to limit interference. According to some embodiments, speaker 136 may be selected according to one or more specifications, including without limitation speaker or driver type, physical size, nominal power, impedance, enclosure type, number of drivers, class (e.g., Class 1-Class 4), crossover frequencies, frequency response, Thiele parameters, sensitivity, and/or maximum sound pressure level.

With continuing reference to FIG. 1, in some embodiments, processor 104 may be additionally configured to modify noise-reducing sound signal 132, for example, as a function of physiological signal 116. Modification of noise-reducing sound signal 132 may be performed to have any physiological or cognitive effects on user. In some cases, modification of noise-reducing sound signal 132 may be performed in a closed-loop (feedback controlled) method using physiological signal 116 as feedback; alternatively or additionally, modification of the noise-reducing sound signal 132 may be performed in an open-loop (non-feedback controlled) method. In cases where control of noise-reducing sound signal 132 is performed in a substantially open-loop manner, control and/or modification of noise-reducing sound signal 132 methods may have been determined at least in part from earlier physiological characteristics 112, for example which have been sensed, measured, or self-reported by a user. For instance, in some cases, modification of noise-reducing signal 132 may be performed according to a set of control parameters or instructions that have been previously determined and a physiological signal 116 need not necessarily be used for modification of the noise-reducing signal 116, for example in real-time. In some cases, control parameters and/or instructions may be predetermined and/or determined by machine-learning processes, for example the machine-learning processes described in this disclosure. Real-time processing may in some cases introduce no appreciable latency. Exemplary latency ranges associated with real-time processing are between about 100 mS and 0.05 mS, or between about 10 mS and 0.5 mS. In some embodiments, modification of noise-reducing sound signal 132 may be performed according to any methods described below.

With continued reference to FIG. 1, in some embodiments, processor 104 may perform generation and/or modification of noise-reducing signal 132 substantially in real-time. "real-time" as used in this disclosure, is an attributive that refers to an occurrence being performed within a latency threshold, such that the occurrence is substantially coincidental according to a context of the occurrence. For instance, in some cases, real-time processing of audio may occur within a latency, such that a human listener would not hear a delay in the audio resulting from processing.

Still referring to FIG. 1, in some embodiments, processor 104 may modify noise-reducing sound signal 132 to selectively pass a component of environmental noise 124. "selectively pass," as used in this disclosure, means selectively modifying noise-reducing sound signal such that sound resulting from a confluence of noise-reducing sound 140 and environmental noise 124, includes the selected sound component that has been passed. "Selected sound component," as used in this disclosure, refers to any component of sound, representable in a signal. In some cases, a selected sound component may be selected, for instance by processor 104, to be passed, amplified, reduced or canceled. In some cases, a sound component may be selectively passed, if the sound component is present in an environmental noise signal 128 and its antiphase component is substantially absent from noise-reducing sound signal 132. Alternatively or additionally, a sound component may be selectively introduced when not present in an environmental noise signal 128, but present (either in-phase or antiphase) within a noise-reducing sound signal 132. Noise-reducing sound signal 132 may, therefore, be modified in order to selectively pass at least a component of environmental noise 124 or selectively introduce at least a component of artificial environmental noise. An "artificial environmental noise signal," as described in this disclosure, is a signal that represents a sound neither present within an environmental noise signal 128, nor an antiphase of a component of the environmental noise signal. In some versions, processor 104 may be additionally configured to modify noise-reducing sound signal 132 to selectively pass a component of environmental noise 124; and the component of environmental noise 124 may have a pass-through frequency. A "pass-through frequency," as used in this disclosure, is a frequency or frequency range of a signal or sound, which may be selectively passed. A pass-through frequency may be considered as belonging to a band of frequencies. In some cases, pass-through frequency may be part of a band-pass, as in band-pass filter. In some cases, band-pass filtering may include a plurality of bands. In some cases, a component of environmental noise passed may include a tone of an alarm and/or a communication link. For instance, in some embodiments, processor 104 may selectively pass certain frequencies of environmental noise 124, thereby ensuring that the certain frequencies are not reduced and/or canceled by system 100. In some cases, processor 104 may select pass-through frequency as a function of physiological signal 116. In some versions, processor 104 may be additionally be configured to modify noise-reducing sound signal 132 to selectively pass a component of environmental noise 124; and the component of environmental noise 124 may have a pass-through frequency. A "pass-through volume," as used in this disclosure, is a volume or volume range of a signal, which is representative of a sound volume, which is being selectively passed. Volume may refer to an amplitude of a sound or a signal representation a sound. In some cases, processor 104, may select pass-through volume as a function of physiological signal 116. In some cases, processor may selectively pass frequencies above a certain range (i.e., High-pass filtration). In some cases, high-pass filtration may be configured to eliminate or reduce user perception of lower frequency noises, such as without limitation rumbling or lower characteristics predominating. In some cases, processor may selectively pass frequencies below a certain range (i.e., Low-pass filtration). In some cases, low frequencies may be configured to eliminate or reduce user perception of metallic stridulations you might get from some machinery. In some cases. processor 104 may be configured to selectively pass many frequencies while selectively filtering at least a frequency band (i.e., Band-stop filtration). In some cases, band-stop filtration may be used to eliminate or reduce user perception of one or more frequency bands that include a pitch or pitch range generated by motors or other elements. In some cases, processor 104 may be configured to digitally detect and mask noise having white noise, pink noise, Gaussian, or other mathematically detectable characteristics (i.e., Signal characteristics filtering). In some cases, signal characteristic filtering may be used to selectively reduce or eliminate user perception of a signature noise type having a signal characteristic, such as without limitation the signal characteristics generated by jet engines, wings, and the like. In some embodiments, a signal characteristic may be determined and/or filtered using a machine-learning process, for example without limitation a supervised machine-learning process including a neural network. In some cases, processor 104 may be configured to digitally detect and pass noise having white noise, pink noise, Gaussian, or other mathematically detectable characteristics (i.e., Signal characteristics pass-through). In some cases, signal characteristic pass-through may be used to selectively pass, allow, and/or enhance user perception of a signature noise type having a signal characteristic, such as without limitation the signal characteristics generated by human voices, communicative and informative sounds, and the like. In some embodiments, a signal characteristic may be determined and/or filtered using a machine-learning process, for example without limitation a supervised machine-learning process including a neural network.

With continued reference to FIG. 1, in some embodiments one or more signals, for instance without limitation physiological signal 116, environmental noise signal, and/or noise-reducing sound signal 132 may be processed, for instance without limitation by one or more sensor 108, microphone 120, speaker, processor, 104 or 136. In some cases, a signal may experience one or more signal processing steps. Signal processing steps may include without limitation any of analyzing, modifying, and/or synthesizing a signal. In some cases, a signal may be processed in order to improve the signal, for instance by improving transmission, storage efficiency, or signal to noise ratio.

With continued reference to FIG. 1, exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT) implemented using hardware and/or software configurations, finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal, for example by using any signal filtering method described in this disclosure, including without limitation signal characteristic filtering and/or signal characteristic pass-through. In some cases, signal analysis (i.e., processing) may include non-linear filtering of signals. An exemplary non-limiting technique for non-linear filtering may include homographic filtering; homographic filtering may include a non-linear mapping of a signal from an original domain to new domain, filtering according to linear processing in the new domain, and then a mapping back to the original domain. In some cases, homographic analysis may be performed to find a cepstrum of a signal. A cepstrum may include a signal transformed into a log-spectrum domain. An exemplary cepstrum is a power spectrum. Power spectrum of a signal may be found thus:

$$C_p=|\{\mathcal{F}^{-1}(|\mathcal{F}\{f(t)\}|^2)\}|^2$$

where, $\mathcal{F}^{-1}$ is inverse Fourier transform, $\mathcal{F}$ is Fourier transform, and f(t) is signal in time domain. In some cases, cepstrum may include any of an autocepstrum, kepstrum, and the like.

With continued reference to FIG. 1, in some embodiments, one or more signals, for instance without limitation environmental noise signal 128 and/or noise-reducing sound signal 132, may include an audio signal. An "audio signal," as used in this disclosure, is a representation of sound. In some cases, an audio signal may include an analog electrical signal of time-varying electrical potential. In some embodiments, an audio signal may be communicated (e.g., transmitted and/or received) by way of an electrically transmissive path (e.g., conductive wire), for instance an audio signal path. Alternatively or additionally, audio signal may include a digital signal of time-varying digital numbers. In some cases, a digital audio signal may be communicated (e.g., transmitted and/or received) by way of any of an optical fiber, at least an electrically transmissive path. In some cases, a line code and/or a communication protocol may be used to aid in communication of a digital audio signal. Exemplary digital audio transports include, without limitation, Alesis Digital Audio Tape (ADAT), Tascam Digital Interface (TDIF), Toshiba Link (TOSLINK), Sony/Philips Digital Interface (S/PDIF), Audio Engineering Society standard 3 (AES3), Multichannel Audio Digital Interface (MADI), Musical Instrument Digital Interface (MIDI), audio over Ethernet, and audio over IP. Audio signals may represent frequencies within an audible range corresponding to ordinary limits of human hearing, for example substantially between about 20 and about 20,000 Hz. According to some embodiments, an audio signal may include one or more parameters, such as without limitation bandwidth, nominal level, power level (e.g., in decibels), and potential level (e.g., in volts). In some cases, relationship between power and potential for an audio signal may be related to an impedance of a signal path of the audio signal. In some cases, a signal path may single-ended or balanced.

With continued reference to FIG. 1, processor 104 may process, for example generate or modify) any signal according to any known signal processing methods, including those described in this disclosure. In some cases, processor 104 may process a signal, for example without limitation an environmental noise signal to identify and/or discriminate a component of the signal, for instance where the component of the signal may be representative of a component of audio (e.g., sound or noise). In some cases, processor 104 may identify and/or discriminate a component of a signal using machine-learning processes and/or known signal processing methods. For instance, in some case, processor 104 may identify and/or discriminate a language component within a signal, where the language component represents auditory (i.e., spoken) language. Identification and/or discrimination of a signal component may include any of signal segmentation (e.g., windowing), feature extraction, and/or component recognition. Component recognition may be used in any signal filtering method described in this disclosure, including without limitation signal characteristic filtering and/or signal characteristic pass-through. For instance, a signal may be segmented into individual segments; in some cases, each segment may have a duration that is a function of a desired latency (e.g., less than desired latency, half desired latency, and the like). Individual segments may be processed individually, sequentially, concurrently, and the like. In some cases, feature extraction may be performed on an individual segment. Signal features may be found through any known means, including for example pattern-recognition, scale-invariant feature transform (SIFT) feature detection, and the like. An exemplary set of resources available for signal processing include MIRToolbox from Matlab of Natick, Massachusetts. In some cases, feature detection may be performed by way of machine-learning processes. Signal features may be derived from any signal variables. Signal variables can be of any time, including without limitation: time-domain variables (e.g., number of peaks, Root Mean Squared (RMS) energy, number of onsets, rhythmic parameters, zero-crossing rate, and the like), spectral variables (e.g., rolloff frequencies, brightness, spectral statistics, and the like), and cepstral variables (e.g., Mel Frequency Cepstral Coefficient, power cepstrum statistics, and the like). In some cases, cepstral variables may be used to determine at least a component of a signal, for instance at least a component related to a fundamental frequency of human speech. In some cases, component recognition within a signal may be performed using supervised, unsupervised or semi-supervised machine-learning processes trained with training representative of the component sought to be recognized. For instance, a machine-learning process may be employed to determine a language component within a signal, and the machine-learning process may be trained using training data included language, for instance without limitation audiobooks. In some cases, a machine-learning process may be trained using general data for global functionality; alternatively or additionally, in some cases, a machine-learning process may undergo a training within a certain context or environment for environment specific, or local, functionality. Machine-learning processes may be performed in any domain, for example domains described within this application, such as without limitation time-domain, spectral-domain, cepstral-domain, wavelet-domain, and the like.

Still referring to FIG. 1, environmental noise may impact a user in any number of ways, for instance physiologically or cognitively. For instance, environmental noise that includes social noises may increase distractibility and decreased focus or concentration, as indicated by increases in verbal recall delay and decreases in working memory. In users that suffer from some mental illnesses, such as schizophrenia, autism, and the like, affects of environmental social noise may be far worse that distractibility, for instance heightened stress, fear, and paranoia all of which may be correlated to detectable physiological characteristics. Distractibility, loss of focus and the like may be correlated to physiological characteristics, for instance without limitation cranial blood oxygenation, eye tracking information, and the like. Social noise may include background babble with few or no discernible words as well as the din of human activity, such as footsteps of a certain audible level, for example between about 50 and 90 dB(A). In some cases, system 100 may be used to modify noise-reducing sound signal by selectively removing a component of environmental noise which is determined to negatively impact a physiological characteristic or state.

Still referring to FIG. 1, conversely environmental noise may have little affect or even beneficial effects on a user. In some cases, system 100 selectively passes environmental noises that neutrally and/or positively affect a physiological characteristic or state. For example, in some cases, impulsive, sudden unexpected bursts of sound or even steady-state sound may cause a physiological affect that in some contexts is beneficial. For example, in some cases, an unexpected impulsive sound may induce a physiological arousal response, which may be detectable from physiological characteristics, such as without limitation cranial blood oxygenation, heart rate, and the like. In some cases, where impulsive sound is not associated with another physically or psychologically harmful occurrence an aroused state may not be stress inducing. In some cases, an arousal response may be beneficial for instance to maintain concentration or focus. In some cases, system 100 may be used to modify noise-reducing sound signal by introducing or allowing to pass through an impulsive sound, for example to induce an arousal response. In some cases, a user may habituate to impulsive sounds over time, diminishing effects of an arousal response. In some cases, system 100 may sense a physiological change as a result of diminishing effects of an arousal response and modify noise-reducing sound signal by adjusting one or more parameters of impulsive sound, for example frequency, tone, volume, duration, period between impulsive sounds, and the like. In some cases, arousal response in a user is related to an unexpected nature of impulsive sound and processor may vary parameters in order to surprise user with an unexpected impulsive sound, thereby maximizing an arousal response. In some cases, processor 104 may vary parameters in a closed look with at least a physiological characteristic. Varying of parameters may be performed using any method in this disclosure, including for instance unsupervised machine learning methods.

Continuing in reference to FIG. 1, in some embodiments, system 100 may be configured to modify noise-reducing signal by modulate noise-reducing signal 132 by alternatingly reducing or canceling a noise and passing or introducing the noise. For instance, in some cases, system 100 may allow a noise or sound component to be heard by a user at one time and not another or allow the noise or sound component to be heard at different volumes or after undergoing different filtering. In some cases, modulating a component of sound will have a physiological effect on a user. As an example, most people can relate to an aroused state that occurs when a portion (or portions) of a phone call cut out. In some cases, system 100 may selectively cut out certain noises or components of sound, in order to modify a physiological characteristic or state of a user.

Continuing in reference to FIG. 1, in some embodiments, system 100 may be configured to actively reduce environmental noise within a tolerable limit. For instance, tolerable limits may include limits of one or more sound variables (e.g., volume and frequency) which are determined not to negatively impact a user's physiological characteristics or state. In some contexts, a user may want or need to hear environmental noise, which are outside of tolerable limits, in these cases, environmental noise may be reduced to through active noise reduction to within tolerable limits.

Continuing in reference to FIG. 1, in some embodiments, system 100 may be configured to stave off sleepiness in a user, or even wake a user up. It is generally well-known that noise can wake up a person or keep a person awake. In some embodiments, system may detect signs of sleepiness or sleep by way of at least a physiological characteristic and introduce or pass-through noise in order to promote wakefulness. Alternatively, in some cases, system 100 may be configured to promote relaxation or even sleepiness. For instance, certain noise conditions, such as white-noise, pink-noise, and/or silence, may promote relaxation or sleepiness in a user. In some cases, system 100 may pass-through environmental white-noise and actively reduce non-white-noise. Alternatively or additionally, in some cases, system 100 may introduce white-noise. Processor 104 may select one or more parameters based on a physiological characteristic of user. For instance, processor 104 may operate according to a closed-loop control process, whereby physiological characteristics are sought to be controlled by way of varying sound parameters. For example without limitation, processor 104, may modify noise-reducing signal 132 in order to decrease heart rate, increase blood oxygenation, and the like.

Still referring to FIG. 1, according to some embodiments, system 100 may additionally include an environmental sensor. Environmental sensor may be configured to sense an environmental characteristic and transmit an environmental signal correlating to the sensed environmental characteristic. In some cases, processor 104 may additionally be configured to receive the environmental signal and modify noise-reducing sound signal 132 as a function of physiological signal 116 and environmental noise signal 128. An environmental sensor may include any sensor, including those described in this disclosure. An environmental characteristic may include any characteristic related to an environment, for example an environment surrounding or proximal to a user. Non-limiting exemplary environmental characteristics include temperature, pressure, acceleration, altitude, and environmental noise.

Still referring to FIG. 1, in some embodiments, system 100 may be configured to modify noise-reducing sound signal 132 such that the perceived location of a sound in the environmental noise signal 128 is altered. As a non-limiting example, this may include altering the perceived location of a sound in environmental noise signal 128 from the behind-right of a user to the forward-right of a user. As a non-limiting example, this may include altering the perceived location of a sound in environmental noise signal from the behind-right of a user to the forward-right of a user. As a non-limiting example, this may include altering the perceived location of a sound in environmental noise signal from the right of a user to the front of a user. In some embodiments, this may include panning components of noise-reducing sound signal 132 from left to right, front to back, and/or the like. In embodiments where speaker 136 includes a plurality of speakers 136, altering the perceived location of a sound in environmental noise signal may include altering which speaker 136 if the plurality of speakers 136 may play the sound.

With continued reference to FIG. 1, modifying noise-reducing sound signal 132 such that the perceived location of a sound in the environmental noise signal 128 is altered may include determining the location of the sound in the environmental noise signal 128. In some embodiments, this may be done using a plurality of microphones 120. In some embodiments, processor 104 may receive from plurality of microphones 120, the time that they detected the sound. Using these times, processor 104, may determine a location of the sound using acoustic location methods. As a non-limiting examples, processor 104 may compare a first time that a first microphone 120 detects the sound to a second time that a second microphone 120 detects the sound. If first microphone 120 detects the sound before second microphone 120, then processor may determine that the location of the sound is closer to first microphone 120 than second microphone 120. Additionally, using a distance between first microphone 120 and second microphone 120, and the difference between first time and second time, processor 104 may estimate a location of the sound. In some embodiments, three or more microphones 120 may be used to determine a location of the sound. Three or more microphones 120 may be positioned in different locations. As a non-limiting example, using the times at which each of the three or more microphones 120 detected the sound, the locations of each of the three or more microphones 120, and the principals of triangulation, processor 104 may determine a location of the sound.

Figure 2:
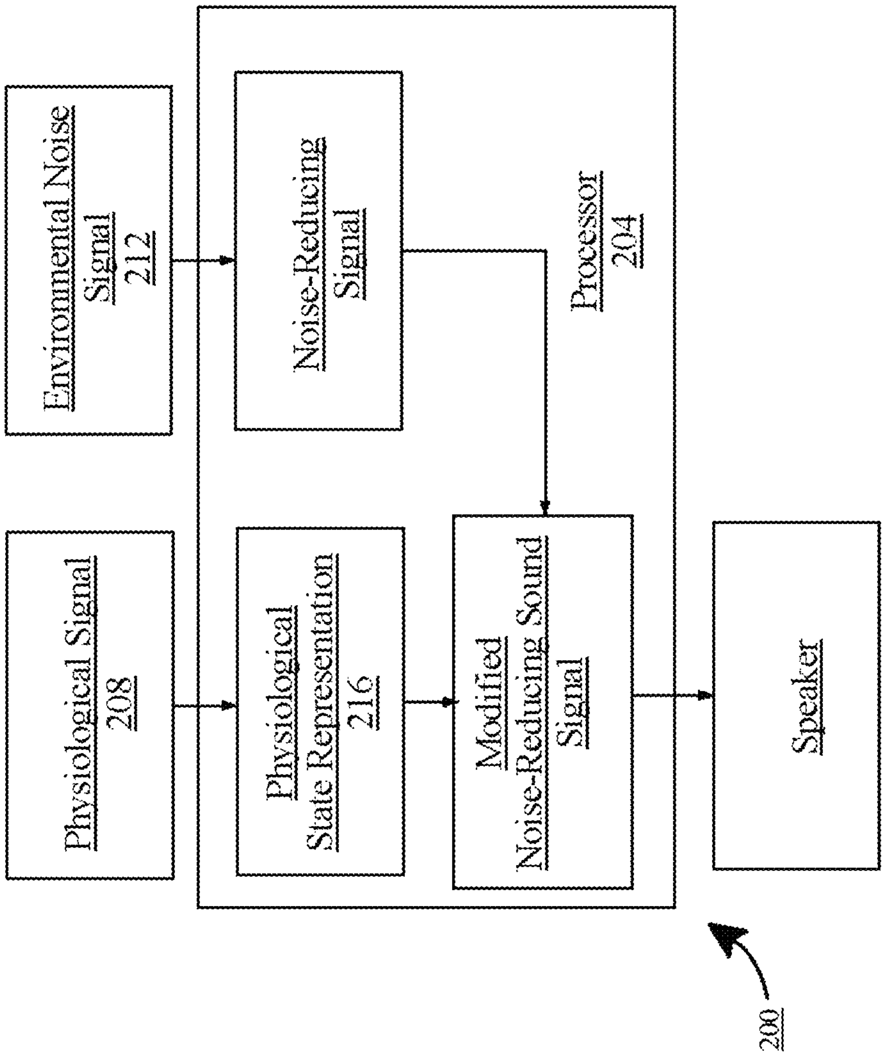
FIG. 2 is a block diagram illustrating an exemplary system for dynamic active noise reduction.

Referring now to FIG. 2, a block diagram illustrates a portion of an exemplary system 200 for dynamic active noise reduction. A processor 204 may be configured to receive a physiological signal 208 and an environmental signal 212. In some cases, processor 204 may determine a physiological state representation 216 of a user as a function of physiological signal 208. In some cases, physiological state representation 216 may represent to a user's physiological state, or instance without limitation a user's cognitive state. Alternatively or additionally, physiological state may relate to any physiological state or manner of being. For example without limitation, physiological state representation 216 may represent any physiological state including any of wakefulness, torpor, anesthesia, arousal, slumber, sopor, drive, flatulence, acapnia (i.e., hypocapnia), hypercapnia, asphyxia, oxygen debt, hyperthermia, hypothermia, normothermia, myasthenia, vitalization, pathology, suspended animation, focus, concentration, relaxation, and the like. In some cases, physiological state representation 216 may include a quantified metric, which is derived from physiological signal 208.

Figure 3:
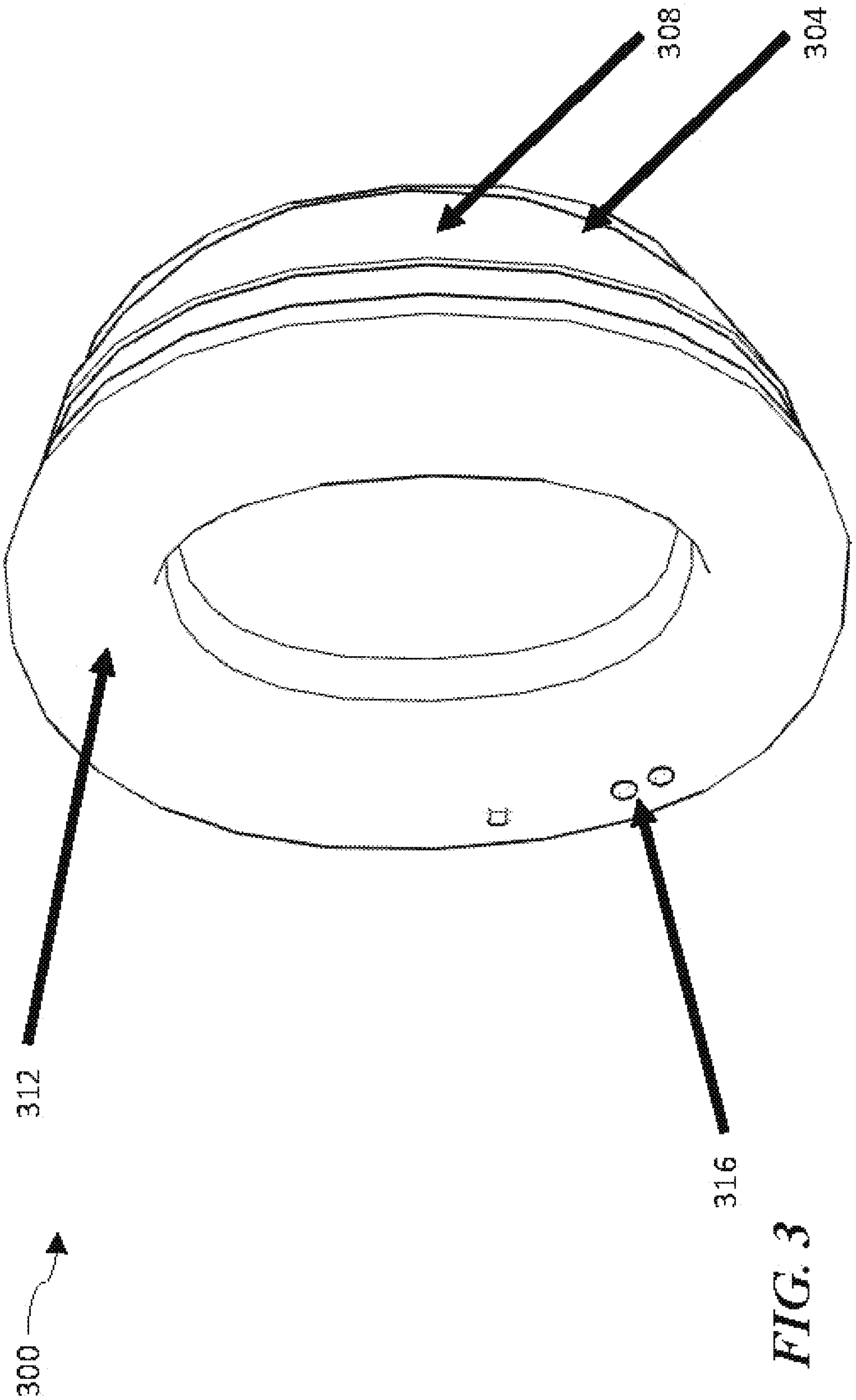
FIG. 3 shows a perspective view of an exemplary device for dynamic active noise reduction.
Figures 4, 5:
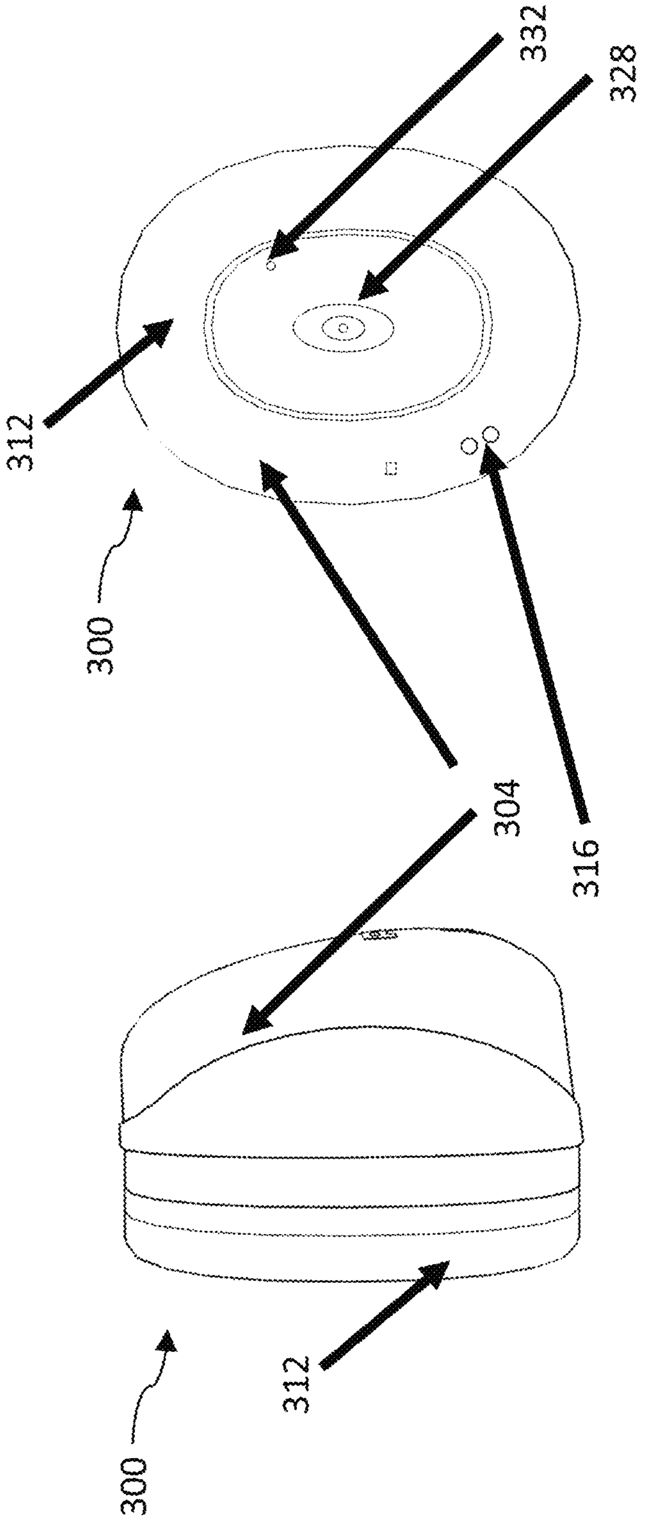
FIG. 4 shows a front view of an exemplary device for dynamic active noise reduction.
FIG. 5 shows a side view of an exemplary device for dynamic active noise reduction.
Figure 6:
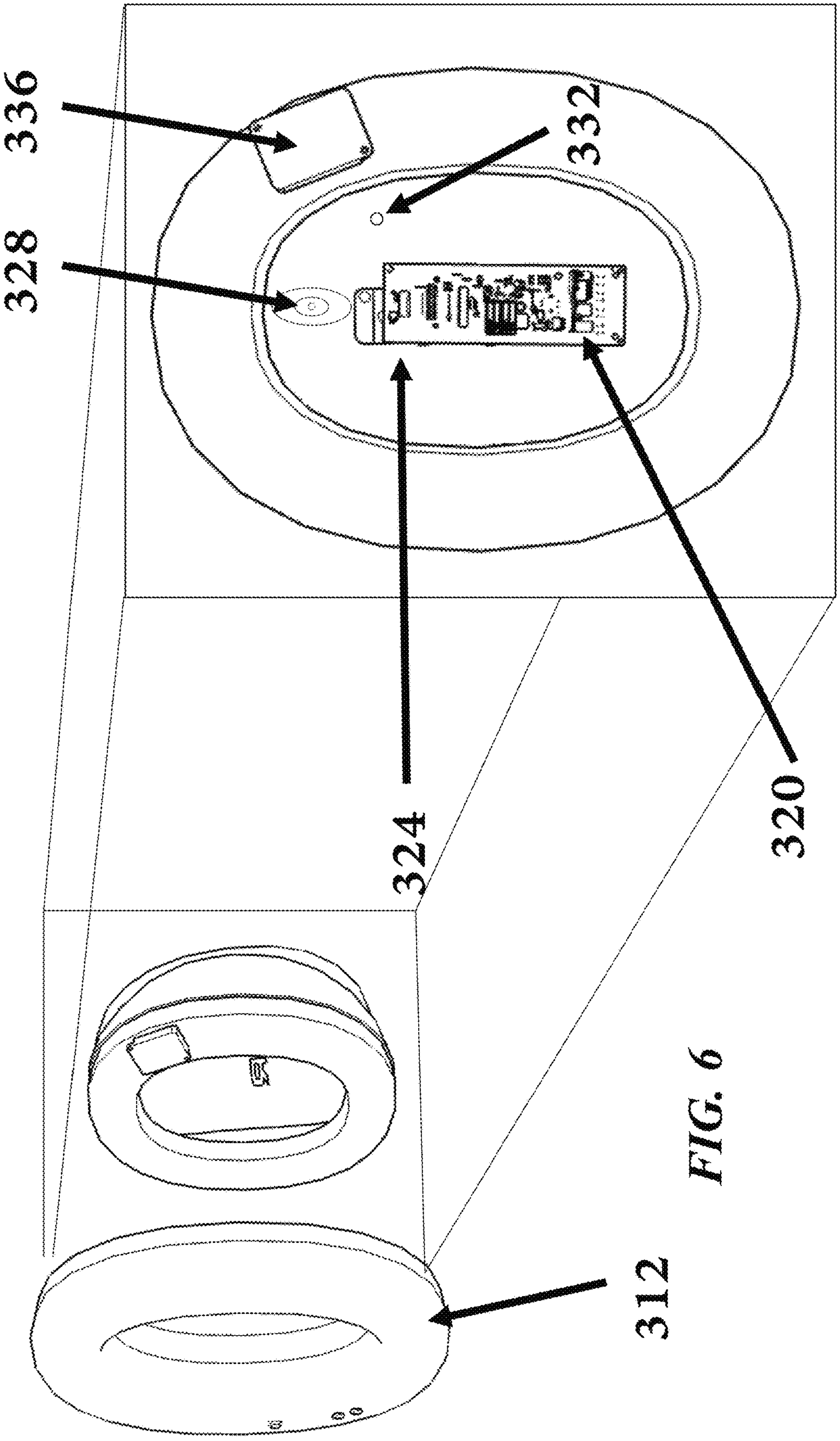
FIG. 6 shows a perspective view of an exemplary device for dynamic active noise reduction.
Figure 7:
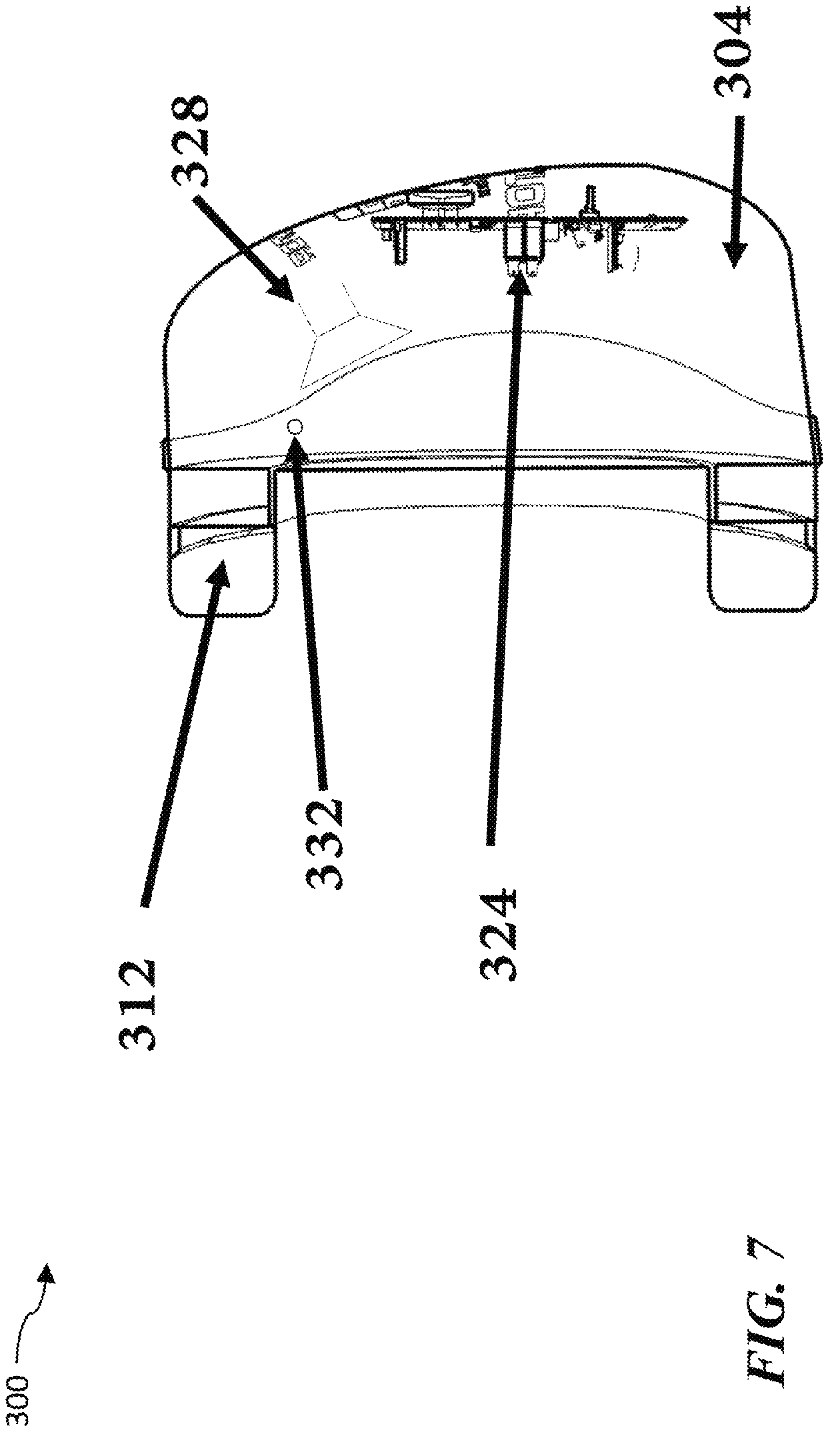
FIG. 7 shows a front sectional view of an exemplary device for dynamic active noise reduction.

Referring now to FIGS. 3-7, an exemplary embodiment of a perspective view of an exemplary device for dynamic active noise reduction 300 is illustrated in FIG. 3. An exemplary embodiment of a side view of an exemplary device for dynamic active noise reduction 300 is illustrated in FIG. 4. An exemplary embodiment of a front view of an exemplary device for dynamic active noise reduction 300 is illustrated in FIG. 5) An exemplary embodiment of a perspective view of an exemplary device for dynamic active noise reduction 300 is illustrated in FIG. 6. An exemplary embodiment of a front sectional view of an exemplary device for dynamic active noise reduction 300 is illustrated in FIG. 7. Referring now to FIG. 3, exemplary device 300 includes a housing 304. Housing 304 may be mounted to an exterior body surface of a user; exterior body surface may include, without limitation, skin, nails such as fingernails or toenails, hair, an interior surface of an orifice such as the mouth, nose, or ears, or the like. A locus on exterior body surface for mounting of housing 304 and/or other components of device may be selected for particular purposes as described in further detail below. Exterior body surface and/or locus may include an exterior body surface of user's head, face, or neck. Housing 304 may be constructed of any material or combination of materials, including without limitation metals, polymer materials such as plastics, wood, fiberglass, carbon fiber, or the like. Housing 304 may include an outer shell 308. Outer shell 308 may, for instance, protect elements of device 300 from damage, and maintain them in a correct position on a user's body as described in further detail below. Housing 304 and/or outer shell 308 may be shaped, formed, or configured to be worn on a head of user; housing 304 and/or outer shell 308 may be shaped to fit over an ear of a user. As a non-limiting example, exterior body surface may be a surface, such as a surface of head, face, or neck of user. As a further non-limiting example, housing 304 may be formed to have a similar or identical shape to an "ear cup"; in an embodiment, device 300 may incorporate one or more elements of ear-cup, including sound-dampening properties, one or more speakers or other elements typically used to emit audio signals in headsets or headphones, or the like. Shell may be rigid, where "rigid" is understood as having properties of an exterior casing typically used in an earcup, over-ear headphone, hearing protection ear covering, or the like; materials used for such a shell may include, without limitation, rigid plastics such as polycarbonate shell plastics typically used in helmets and hardhats, metals such as steel, and the like. Persons skilled in the art, upon reading the entirety of this disclosure, will understand "rigid" in this context as signifying sufficient resistance to shear forces, deformations, and impacts to protect electronic components as generally required for devices of this nature.

Still viewing FIGS. 3-7, housing 304 may include a seal 312 that rests against exterior body surface when housing 304 is mounted thereon. Seal 312 may be pliable; seal 312 may be constructed of elastomeric, elastic, or flexible materials including without limitation flexible, elastomeric, or elastic rubber, plastic, silicone including medical grade silicone, gel, and the like. Pliable seal 312 may include any combination of materials demonstrating flexible, elastomeric, or elastic properties, including without limitation foams covered with flexible membranes or sheets of polymer, leather, or textile material. As a non-limiting example, pliable seal 312 may include any suitable pliable material for a skin-contacting seal portion of an earcup or other device configured for placement over a user's ear, including without limitation any pliable material or combination of materials suitable for use on headphones, headsets, earbuds, or the like. In an embodiment, pliable seal 312 advantageously aids in maintaining housing 304 and/or other components of device 300 against exterior body surface; for instance, where exterior body surface has elastomeric properties and may be expected to flex, stretch, or otherwise alter its shape or position to during operation, pliable seal 312 may also stretch, flex, or otherwise alter its shape similarly under similar conditions, which may have the effect of maintaining seal 312 and/or one or more components of device 300 as described in greater detail below, in consistent contact with the exterior body surface. Seal 312 may be attached to housing 304 by any suitable means, including without limitation adhesion, fastening by stitching, stapling, or other penetrative means, snapping together or otherwise engaging interlocking parts, or the like. Seal 312 may be removably attached to housing 304, where removable attachment signifies attachment according to a process that permits repeated attachment and detachment without noticeable damage to housing 304 and/or seal 312, and without noticeable impairment of an ability to reattach again by the same process. As a non-limiting example, pliable seal 312 may be placed on an ear cup of the housing 304; pliable seal maybe formed of materials and/or in a shape suitable for use as an ear seal in an ear cup of a helmet, an over-ear headphone or hearing protection device, or the like. Persons skilled in the art, upon reviewing this disclosure in its entirety, will be aware of forms and material properties suitable for use as seal 312, including without limitation a degree and/or standard of pliability required and/or useful to function as a seal 312 in this context. In some cases, one or more of seal 312, housing 304, and shell 308 may be configured to perform passive noise reduction. For example, in some cases, one or more of seal 312, housing 304, and shell 308 may include acoustic insulation. Acoustic insulation may be performed in part through absorbing sound waves. Absorbing may be performed by, among other things, fibrous materials, porous absorbers, or resonant absorbers; as such, in some cases, one or more of seal 312, housing 304, and shell 308 may include or contain a fibrous material, a porous absorber, or a resonant absorber. Non-limiting exemplary acoustic absorbing fibrous materials include cellulose, mineral wool, fiberglass, and textiles such as wool. Non-limiting acoustic absorbing porous absorbers include rubber foams and melamine sponges. In some cases, a porous absorber may be selected to absorb certain sound components, for instance frequencies or powers. Selection of porous absorber may include selection of porous absorbed parameters including, without limitation, pore size, tortuosity, porosity, thickness, density, and the like. Acoustic insulation may also be performed in some cases, by dampening sound (e.g., environmental noise). Dampening may reduce a resonance of an environment (e.g., aural-proximal or inter-aural environments).

With continued reference to FIGS. 3-7, housing 304 may include, be incorporated in, or be attached to an element containing additional components to device 300. For instance, in an embodiment, housing 304 may include, be incorporated in, or be attached to a headset; headset may include, without limitation, an aviation headset, such as headsets as manufactured by the David Clark company of Worcester Massachusetts, or similar apparatuses. In some embodiments, housing 304 is headset; that is, device 300 may be manufactured by incorporating one or more components into the headset, using the headset as a housing 304. As a further non-limiting example, housing 304 may include a mask; a mask as used herein may include any device or element of clothing that is worn on a face of user during operation, occluding at least a part of the face. Masks may include, without limitation, safety googles, gas masks, dust masks, self-contained breathing apparatuses (SCBA), self-contained underwater breathing apparatuses (SCUBA), and/or other devices worn on and at least partially occluding the face for safety, functional, or aesthetic purposes. Housing 304 may be mask; that is, device 300 may be manufactured by incorporating one or more elements or components of device 300 in or on mask, using mask as housing 304. Housing 304 may include, be incorporated in, or be attached to an element of headgear, defined as any element worn on and partially occluding a head or cranium of user. Headgear may wholly or partially occlude user's face and thus also include a mask; headgear may include, for instance, a fully enclosed diving helmet, space helmet or helmet incorporated in a space suit, or the like. Headgear may include a headband, such as without limitation a headband of a headset, which may be an aviation headset. Headgear may include a hat. Headgear may include a helmet, including a motorcycle helmet, a helmet used in automobile racing, any helmet used in any military process or operation, a construction "hardhat," a bicycle helmet, or the like. In an embodiment, housing 304 is shaped to conform to a particular portion of user anatomy when placed on exterior body surface; when placed to so conform, housing 304 may position at least a sensor and/or user-signaling device 336 in a locus chosen as described in further detail below. For instance, where housing 304 is incorporated in a helmet, mask, earcup or headset, housing 304 may be positioned at a particular portion of user's head when helmet, mask, earcup or headset is worn, which may in turn position at least a sensor and/or user-signaling device 336 at a particular locus on user's head or neck.

Continuing to refer to FIGS. 3-7, device 300 includes at least a physiological sensor 316. At least a physiological sensor 316 may include any sensor described in this disclosure, for instance in reference to FIGS. 1-2. At least a physiological sensor 316 is configured to detect at least a physiological parameter and transmit an electrical signal as a result of the detection; transmission of an electrical signal, as used herein, includes any detectable alternation of an electrical parameter of an electrical circuit incorporating at least a physiological sensor 316. For instance, at least a physiological sensor 316 may increase or reduce the impedance and/or resistance of a circuit to which at least a physiological sensor 316 is connected. At least a physiological sensor 316 may alter a voltage or current level, frequency, waveform, amplitude, or other characteristic at a locus in circuit. Transmission of an electrical signal may include modulation or alteration of power circulating in circuit; for instance transmission may include closing a circuit, transmitting a voltage pulse through circuit, or the like. Transmission may include driving a non-electric signaling apparatus such as a device for transmitting a signal using magnetic or electric fields, electromagnetic radiation, optical or infrared signals, or the like.

Still referring to FIGS. 3-7, at least a physiological parameter, as used herein, includes any datum that may be captured by a sensor, and describing a physiological state of user. At least a physiological parameter may include at least a circulatory and/or hematological parameter, which may include any detectable parameter describing the state of blood vessels such as arteries, veins, or capillaries, any datum describing the rate, volume, pressure, pulse rate, or other state of flow of blood or other fluid through such blood vessels, chemical state of such blood or other fluid, or any other parameter relative to health or current physiological state of user as it pertains to the cardiovascular system. As a non-limiting example, at least a circulatory parameter may include a blood oxygenation level of user's blood. At least a circulatory parameter may include a pulse rate. At least a circulatory parameter may include a blood pressure level. At least a circulatory parameter may include heart rate variability and rhythm. At least a circulatory parameter may include a plethysmograph describing user blood-flow; in an embodiment, plethysmograph may describe a reflectance of red or near-infrared light from blood. One circulatory parameter may be used to determine, detect, or generate another circulatory parameter; for instance, a plethysmograph may be used to determine pulse and/or blood oxygen level (for instance by detecting plethysmograph amplitude), pulse rate (for instance by detecting plethysmograph frequency), heart rate variability and rhythm (for instance by tracking pulse rate and other factors over time), and blood pressure, among other things. At least a physiological sensor may be configured to detect at least a hematological parameter of at least a branch of a carotid artery; at least a physiological parameter may be positioned to capture the at least a hematological parameter by placement on a location of housing that causes at least a physiological sensor to be placed in close proximity to the at least a branch; for instance, where housing is configured to be mounted to a certain location on a user's cranium, and in a certain orientation, such as when housing forms all or part of a helmet, headset, mask, element of headgear, or the like, at least a physiological sensor may include a sensor so positioned on the housing or an extension thereof that it will contact or be proximate to a locus on the user's skin under which the at least a branch runs. As a non-limiting example, where device 300 forms an earcup or earphone, at least a physiological sensor 316 may include a sensor disposed on or embedded in a portion of the earcup and/or earphone contacting a user's skin over a major branch of the external carotid artery that runs near or past the user's ear.

In an embodiment, and still viewing FIGS. 3-7, detection of hematological parameters of at least a branch of a carotid artery may enable device 300 to determine hematological parameters of a user's central nervous system with greater accuracy than is typically found in devices configured to measure hematological parameters. For instance, a blood oxygen sensor placed on a finger or other extremity may detect low blood oxygen levels in situations in which the central nervous system is still receiving adequate oxygen, because a body's parasympathetic response to decreasing oxygen levels may include processes whereby blood perfusion to the appendages is constricted in order to sustain higher oxygen levels to the brain; in contrast, by directly monitoring the oxygenation of a major branch of the external carotid artery, the measurement of oxygenation to the central nervous system may be more likely to achieve a more accurate indication of oxygen saturation than a peripheral monitor. Use of the carotid artery in this way may further result in a more rapid detection of a genuine onset of hypoxemia; as a result, a person such as a pilot that is using device 300 may be able to function longer under conditions tending to induce hypoxemia, knowing that an accurate detection of symptoms may be performed rapidly and accurately enough to warn the user. This advantage may both aid in and be augmented by use with training processes as set forth in further detail below.

With continued reference to FIGS. 3-7, at least a physiological sensor 316 may include a hydration sensor; hydration sensor may determine a degree to which a user has an adequate amount of hydration, where hydration is defined as the amount of water and/or concentration of water versus solutes such as electrolytes in water, in a person's body. Hydration sensor may use one or more elements of physiological data, such as sweat content and/or hematological parameters detected without limitation using plethysmography, to determine a degree of hydration of a user; degree of hydration may be associated with an ability to perform under various circumstances. For instance, a person with adequate hydration may be better able to resist the effects of hypoxemia in high-altitude and/or high-G for longer or under more severe circumstances, either because the person's body is better able to respond to causes of hypoxemia and delay onset, or because the person is better able to cope with diminished blood oxygen; this may be true of other conditions and/or physiological states detected using at least a physiological sensor 316, and may be detected using heuristics or relationships derived, without limitation, using machine learning and/or data analysis as set forth in further detail below.

Still referring to FIGS. 3-7, at least a physiological sensor 316 may include a volatile organic compound (VOC) sensor.

VOC sensor may sense VOCs, including ketones such as acetone; a user may emit ketones in greater quantities when undergoing some forms of physiological stress, including without limitation hypoglycemia resulting from fasting or overwork, which sometimes results in a metabolic condition known as ketosis. As a result, detections of higher quantities of ketones may indicate a high degree of exhaustion or low degree of available energy; this may be associated with a lessened ability to cope with other physiological conditions and/or parameters that may be detected by or using at least a physiological sensor 316, such as hypoxemia, and/or environmental stressors such as high altitude or G-forces. Such associations may be detected or derived using data analysis and/or machine learning as described in further detail below.

With continued reference to FIGS. 3-7, at least a physiological parameter may include neural oscillations generated by user neurons, including without limitation neural oscillations detected in the user's cranial region, sometimes referred to as "brainwaves." Neural oscillations include electrical or magnetic oscillations generated by neurological activity, generally of a plurality of neurons, including superficial cranial neurons, thalamic pacemaker cells, or the like. Neural oscillations may include alpha waves or Berger's waves, characterized by frequencies on the order of 7.5-12.5 Hertz, beta waves, characterized by frequencies on the order of 13-30 Hertz, delta waves, having frequencies ranging from 1-4 Hertz, theta waves, having frequencies ranging from 4-8 Hertz, low gamma waves having frequencies from 30-70 Hertz, and high gamma waves, which have frequencies from 70-150 Hertz. Neurological oscillations may be associated with degrees of wakefulness, consciousness, or other neurological states of user, for instance as described in further detail below. At least a sensor may detect body temperature of at least a portion of user's body, using any suitable method or component for temperature sensing.

Still referring to FIGS. 3-7, at least a physiological sensor 316 may include an optical sensor, which detects light emitted, reflected, or passing through human tissue. Optical sensor may include a near-infrared spectroscopy sensor (NIRS). A NIRS, as used herein, is a sensor that detects signals in the near-infrared electromagnetic spectrum region, having wavelengths between 780 nanometers and 2,500 nanometers.

Figure 8:
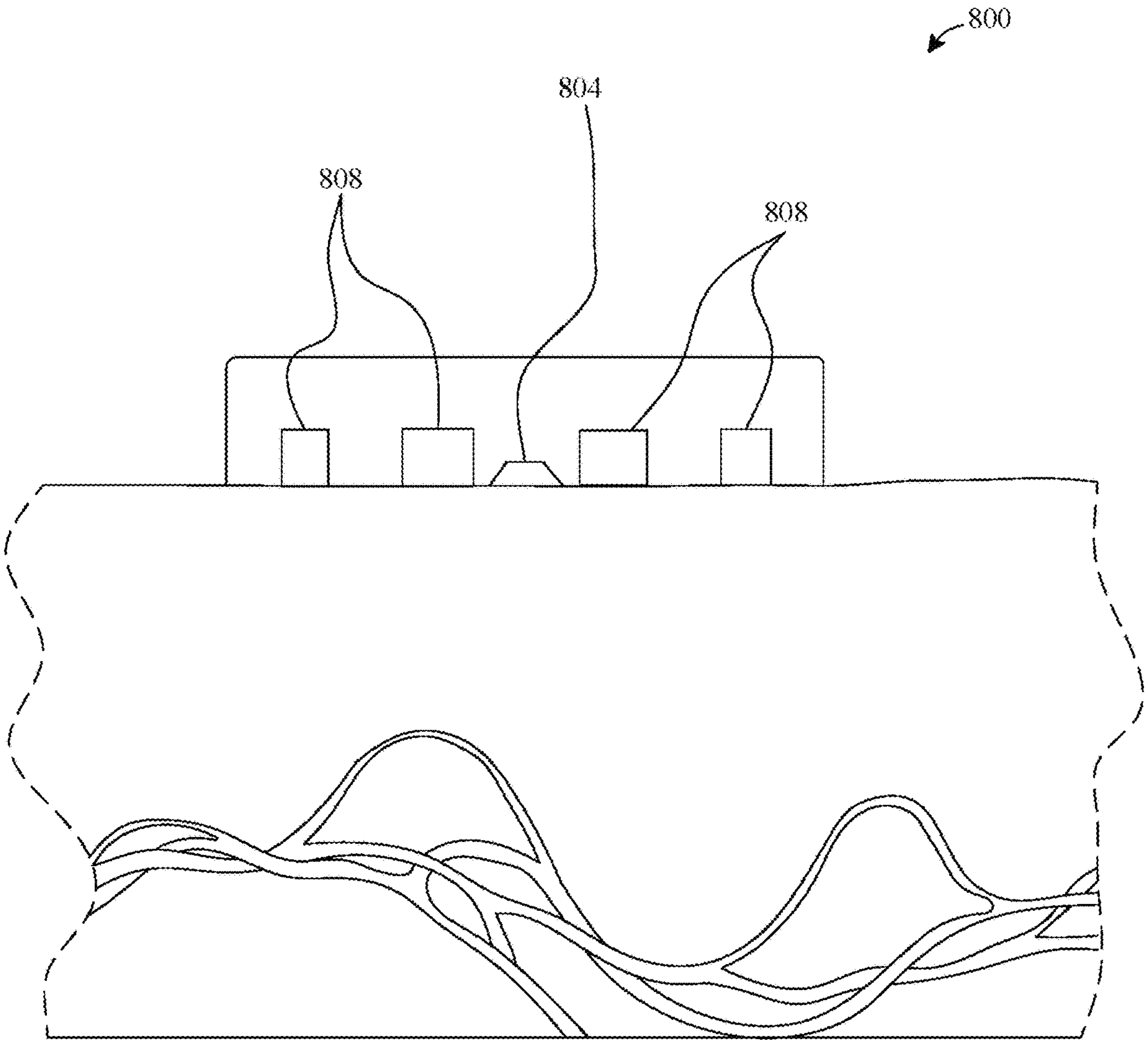
FIG. 8 is a schematic illustration of an exemplary embodiment of a near-infrared spectroscopy sensor.

Referring briefly to FIG. 8, FIG. 8 illustrates an exemplary embodiment of a NIRS 800 against an exterior body surface, which may include skin. NIRS 800 may include a light source 804, which may include one or more light-emitting diodes (LEDs) or similar element. Light source 804 may, as a non-limiting example, convert electric energy into near-infrared electromagnetic signals. Light source 604 may include one or more lasers. NIRS 800 may include one or more detectors 808 configured to detect light in the near-infrared spectrum. Although the wavelengths described herein are infrared and near-infrared, light source 804 may alternatively or additionally emit light in one or more other wavelengths, including without limitation blue, green, ultraviolet, or other light, which may be used to sense additional physiological parameters. In an embodiment, light source may include one or more multi-wavelength light emitters, such as one or more multi-wavelength LEDs, permitting detection of blood-gas toxicology. Additional gases or other blood parameters so detected may include, without limitation CO2 saturation levels, state of hemoglobin as opposed to blood oxygen saturation generally. One or more detectors 808 may include, without limitation, charge-coupled devices (CCDs) biased for photon detection, indium gallium arsenide (InGaAs) photodetectors, lead sulfide (PbS) photodetectors, or the like. NIRS 800 may further include one or more intermediary optical elements (not shown), which may include dispersive elements such as prisms or diffraction gratings, or the like. In an embodiment, NIRS 800 may be used to detect one or more circulatory parameters, which may include any detectable parameter further comprises at least a circulatory parameter. At least a physiological sensor 316 may include at least two sensors mounted on opposite sides of user's cranium.

Referring again to FIGS. 3-7, at least a physiological sensor 316 may include a neural activity sensor. A neural activity sensor, as used herein, includes any sensor disposed to detect electrical or magnetic phenomena generated by neurons, including cranial neurons such as those located in the brain or brainstem. Neural activity sensor may include an electroencephalographic sensor. Neural activity sensor may include a magnetoencephalographic sensor. In an embodiment, neural activity sensor may be configured to detect neural oscillations. At least a sensor may include an eye-tracking sensor, such as one or more cameras for tracking the eyes of user. Eye-tracking sensor may include, as a non-limiting example, one or more electromyographic (EMG) sensors, which may detect electrical activity of eye muscles; electrical activity may indicate activation of one or more eye muscles to move the eye and used by a circuit such as an alert circuit as described below to determine a movement of user's eyeball, and thus its current location of focus.

Continuing to refer to FIGS. 3-7, device 300, in some embodiments, may include a respiration sensor, for example an inhalation sensor or an exhalation sensor. A respiration sensor may include any sensor configured to sense a physiological characteristic related to a user's respiration, for example respiration rate, respiration rate, respiration $CO_2$ levels, respiration $O_2$ levels, and the like. Additional disclosure related to respiration sensors is included in U.S. patent application Ser. No. 16/933,680 entitled "COMBINED EXHALED AIR AND ENVIRONMENTAL GAS SENSOR APPARATUS," by B. Everman et al., which is incorporated herein by reference in its entirety.

Continuing to refer to FIGS. 3-7, device 300 may communicate with one or more physiological sensors that are not a part of device 300; one or more physiological sensors may include any sensor suitable for use as at least a physiological sensor 316 and/or any other physiological sensor. Communication with physiological sensors that are not part of device may be accomplished by any means for wired or wireless communication between devices and/or components as described herein. Device may detect and/or measure at least a physiological parameter using any suitable combination of at least a physiological sensor and/or physiological sensors that are not a part of device 300. Device 300 may combine two or more physiological parameters to detect a physiological state. For instance, and without limitation, where device 300 is configured to detect hypoxic incapacitation and/or one or more degrees of hypoxemia as described in further detail below, device 300 may perform such determination using a combination of heart rate and blood oxygen saturation, as detected by one or more sensor as described above.

Still viewing FIGS. 3-7, at least a physiological sensor 316 may be attached to housing 304; attachment to housing 304 may include mounting on an exterior surface of housing 304, incorporation within housing 304, electrical connection to another element within housing 304, or the like. Alternatively or additionally, at least a physiological sensor 316 may include a sensor that is not attached to housing 304 or is indirectly attached via wiring, wireless connections, or the like. As a non-limiting example, at least a physiological sensor 316 and/or one or more components thereof may be coupled to the pliable seal 312. In an embodiment, at least a physiological sensor 316 may be contacting exterior body surface; this may include direct contact with the exterior body surface, or indirect contact for instance through a portion of seal 312 or other components of device 300. In an embodiment, at least a physiological sensor 316 may contact a locus on the exterior body surface where substantially no muscle is located between the exterior body surface and an underlying bone structure, meaning muscle is not located between the exterior body surface and an underlying bone structure and/or any muscle tissue located there is unnoticeable to a user as a muscle and/or incapable of appreciably flexing or changing its width in response to neural signals; such a locus may include, as a non-limiting example, locations on the upper cranium, forehead, nose, behind the ear, at the end of an elbow, on a kneecap, at the coccyx, or the like. Location at a locus where muscle is not located between exterior body surface and underlying bone structure may decrease reading interference and/or inaccuracies created by movement and flexing of muscular tissue. At least a physiological sensor 316 may contact a locus having little or no hair on top of skin. At least a physiological sensor 316 may contact a locus near to a blood vessel, such as a locus where a large artery such as the carotid artery or a branch thereof, or a large vein such as the jugular vein, runs near to skin or bone at the location; in an embodiment, such a position may permit at least a physiological sensor 316 to detect circulatory parameters as described above.

Figure 9:
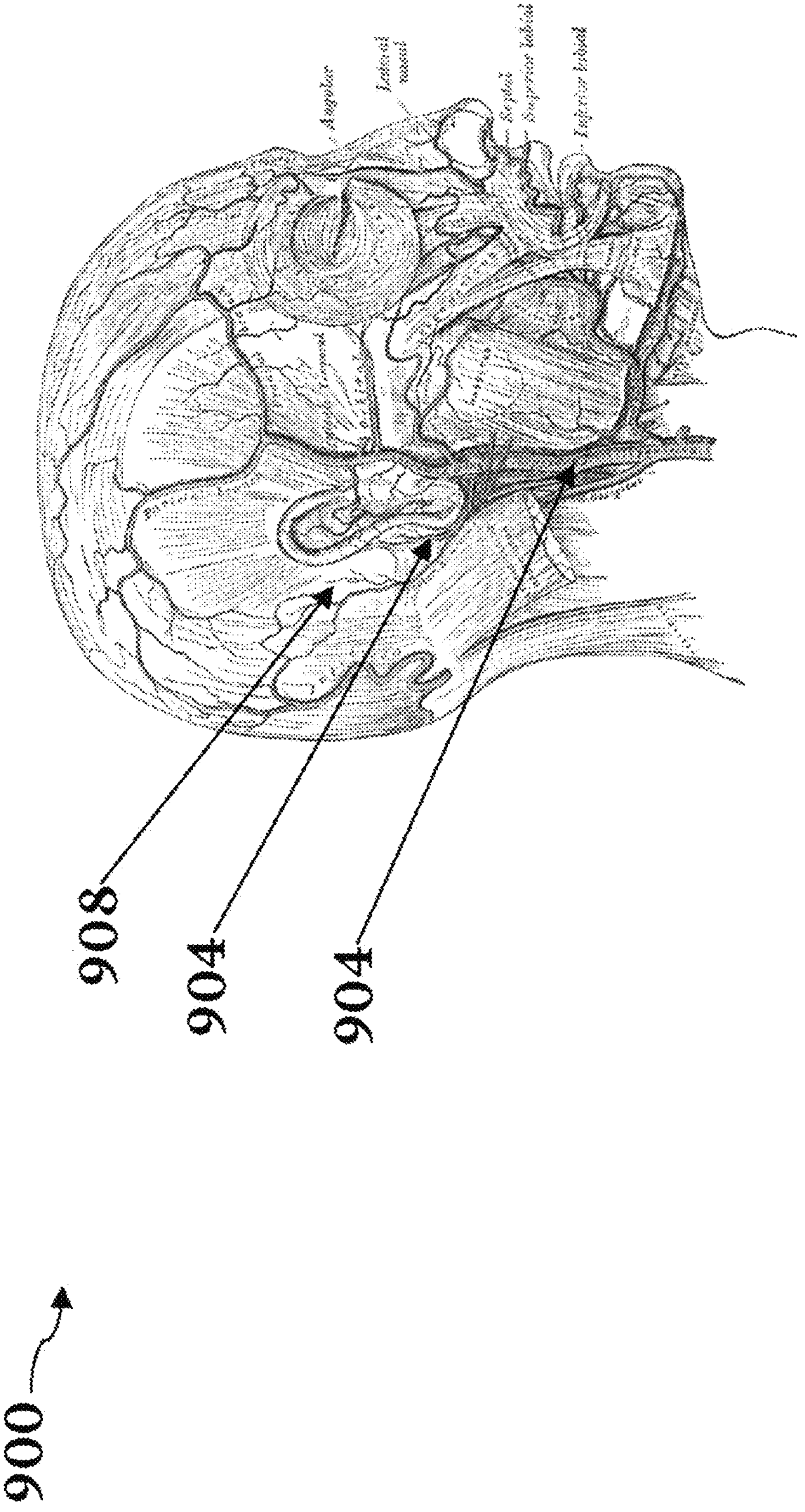
FIG. 9 is a schematic diagram of some aspects of user cranial anatomy in an embodiment.

Referring now to FIG. 9, a schematic diagram of anatomy of a portion of a user cranium 900 is illustrated for exemplary purposes. At least a physiological sensor 316 may, for instance, be placed at or near to a locus adjacent to a branch 904 of a carotid artery, which may be a branch of an exterior carotid artery. At least a physiological sensor 316 may be placed at a location 908 where substantially no muscle is found between a user's skin and bone; such a location may be found, for instance, near to the user's neck behind the ear. In an embodiment, at least a physiological sensor may be placed in a locus that is both adjacent to a branch 904 of a carotid artery and has substantially no muscle between skin and bone. In an embodiment, measurement of at least a physiological parameter, including without limitation pulse oxygenation and/or pulse rate as described in further detail below, on a particular portion of the cranium may eliminate interfering factors such as sweat and movement artifact; measurement above the neck may further eliminate measurement issues experienced at the extremities (finger, wrist) due to temperature variation, movement and blood pooling under G. Where multiple physiological sensors of at least a physiological sensor 316 are used, at least two sensors may be placed at two locations on a user's cranium; for instance, two sensors, one on each side of the cranium, may provide validation of consistent data, and assures a high capture rate of data in flight. Two sensors may be so placed, as noted elsewhere in this disclosure, by form and/or configuration of housing 304; for instance, housing 304 may include two earcups or other over-ear devices as described above.

As a non-limiting example of placement of at least a physiological sensor 316, and as illustrated for exemplary purposes in FIGS. 3-7, at least a physiological sensor 316 may include a sensor mounted on an edge of an earcup, and so positioned that placement of earcup over user's ear places sensor in contact with user's head just behind the ear at a local skeletal eminence, with substantially no muscle tissue between skin and bone and a branch of the carotid artery nearby for detection of circulatory parameters. Similarly, where housing 304 includes a mask as described above, a sensor of at least a physiological sensor 316 may be disposed within mask at a location that, when mask is worn, places sensor against a forehead of user.

Still viewing FIGS. 3-7, where at least a physiological sensor 316 includes a neural activity sensor, at least a physiological sensor 316 may include one or more sensors placed in locations suitable for detection of neural activity, such as on upper surfaces of a cranium of user, or similar locations as suitable for EEG or MEG detection and measurement.

With continued reference to FIGS. 3-7, device 300 may include a processor 320 in communication with the at least a physiological sensor. As used herein, a device, component, or circuit is "in communication" where the device, component, or circuit is able to receive data from and/or transmit data to another device, component, or circuit. In an embodiment, devices are placed in communication by electrically coupling at least an output of one device, component, or circuit to at least an input of another device, component, or circuit. Devices may further be placed in communication by creating an optical, inductive, or other coupling between two or more devices. Devices in communication may be placed in near field communication with one another. Two or more devices may be in communication where the two or more devices are configured to send and/or receive signals to or from each other. Placement of devices in communication may include direct or indirect connection and/or transmission of data; for instance, two or more devices may be connected or otherwise in communication by way of an intermediate circuit. Placement of devices in communication with each other may be performed via a bus or other facility for intercommunication between elements of a computing device as described in further detail in this disclosure. Placement of devices in communication with each other may include fabrication together on a shared integrated circuit and/or wafer; for instance, and without limitation, two or more communicatively coupled devices may be combined in a single monolithic unit or module.

With continued reference to FIGS. 3-7, processor 320 may be constructed according to any suitable process or combination of processes for constructing an electrical circuit; for instance, and without limitation, processor 320 may include a printed circuit board. Processor 320 may include a battery or other power supply; where processor 320 is integrated in one or more other systems as described in further detail below, processor 320 may draw electrical power from one or more circuit elements and/or power supplies of such systems. Processor 320 may include a memory; memory may include any memory as described in this disclosure. Processor 320 may include one or more processors as described in this disclosure, including without limitation a microcontroller or low-power microprocessor. In an embodiment, memory may be used to store one or more signals received from at least a physiological sensor 316.

Still referring to FIGS. 3-7, processor 320 may be in communication with at least an environmental sensor 324; at least an environmental sensor 324 may be any sensor configured to detect at least an environmental parameter, defined herein as a parameter describing non-physiological data concerning user or surroundings of user, such as acceleration, carbon monoxide, or the like. At least an environmental sensor 324 may include at least a motion sensor, including without limitation one or more accelerometers, gyroscopes, magnetometers, or the like; at least a motion sensor may include an inertial measurement unit (IMU). At least an environmental sensor 324 may include at least a temperature sensor. At least an environmental sensor 324 may include at least an air quality sensor, such as without limitation a carbon monoxide sensor, or other sensor of any gas or particulate matter in air. At least an environmental sensor may include an atmospheric oxygen sensor, an oxygen flow meter, and/or a mask oxygen/$CO_2$ sensor. At least an environmental sensor 324 may include at least a barometric sensor. At least an environmental sensor 324 may include a pressure sensor, for instance to detect air or water pressure external to user. Processor 320 may be attached to housing 304, for instance by incorporation within housing 304; as a non-limiting example and as shown in FIG. 7, the processor 320 may be housed along an inner wall of the housing 304. Processor 320 may be attached to an exterior of housing 304. According to an embodiment, a covering may be placed over housing 304, fully enclosing the processor 320 within the housing 304; the enclosure may include a plastic, a metal, a mesh-type material, and/or any other suitable material. Processor 320 may be in another location not attached to or incorporated in housing 304. Processor 320 may be incorporated into and/or connected to one or more additional elements including any elements incorporating or connected to user signaling devices as described in further detail below. As an alternative to storage of one or more parameter values such as physiological parameters or environmental parameters in memory, alert circuit may transmit the data to one or more remote storage mediums through one or more wired and/or wireless means.

With continued reference to FIGS. 3-7, device 300 may include a speaker 328. Speaker may be configured to transduce an audio signal into sound. In some cases, device 300 may include at least a microphone 332 to capture environmental noise and be configured to perform active noise reduction, using the microphone and speaker 328. In some cases, processor 320 may perform processes necessary to perform active noise reduction, for example by generating a noise-reducing signal as described above.

With continued reference to FIGS. 3-7, processor 320 may be configured to receive at least a signal from the at least a physiological sensor 316, modify a noise-reducing sound signal as a function of the at least a signal, and to transmit the noise-reducing sound signal to a speaker 328 in communication with the processor 320. Processor 320 may periodically sample data from at least a sensor; in a non-limiting example, data may be sampled 75 times per second; alternatively, or additionally, sampling of any sample and/or parameter may be event driven, such as a sensor that activates upon a threshold of a sensed parameter being crossed, which may trigger an interrupt of processor 320, or the like. In an embodiment, noise-reducing signal is modified upon detection of any signal at all from at least a physiological sensor 316; for instance, at least a physiological sensor 316 may be configured only to signal processor 320 upon detection of a physiological characteristic indicative of a physiological state change. Alternatively or additionally, processor 320 may be further configured to modify noise-reducing signal of a physiological state. In an embodiment, a physiological state includes any physiological condition of user; as a non-limiting example, if user participating in an online class and physiological condition becomes such that user is unable to concentrate, or otherwise be unable to successfully participate in class, processor may modify noise-reducing signal for example to pass-through a component of environmental noise and thereby modify the physiological state of the user.

Still referring to FIGS. 3-7, processor 320 may be configured to perform any embodiment of any method and/or method step as described in this disclosure. For instance, and without limitation, processor 320 may be designed and configured to detect a causative association with hypoxemia, measure, using at least a physiological sensor, at least a physiological parameter associated with hypoxemia, and determine, by the processor 320, and based on the at least a physiological parameter, a degree of user hypoxemia.

In an embodiment, and still viewing FIGS. 3-7, determination of a physiological state may include comparison of at least a physiological parameter to a threshold level. For instance, and without limitation, detection of physiological state may further comprise determination that at least a physiological parameter is falling below a threshold level; as an example, blood oxygen levels below a certain cutoff indicate an imminent loss of consciousness, as may blood pressure below a certain threshold. Similarly detection of a physiological state may include detection of alpha wave activity falling below a certain point, which may indicate entry into early stages of sleep or a hypnagogic state, and/or entry into unconsciousness. Comparison to threshold to detect physiological state may include comparison of at least a physiological parameter to a value stored in memory, which may be a digitally stored value; alternatively or additionally comparison may be performed by analog circuitry, for instance by comparing a potential representing at least a physical parameter to a reference potential representing the threshold, by means of a comparator or the like. Threshold may represent or be represented by a baseline value. Detection of a physiological state may include comparison to two thresholds; for instance, detection that incapacitation and/or loss of consciousness due to hypoxemia is imminent may include detection that a user's heart rate has exceeded one threshold for heart rate and simultaneous or temporally proximal detection that blood oxygen saturation has fallen below a second threshold. Threshold or thresholds used for such comparison to detect a physiological state may include universal and/or default thresholds. For instance, device 300 may be set, prior to use with a particular individual, with thresholds corresponding to a typical user's response to physiological conditions. For instance, device 300 may initially store a threshold in memory of device 300 of 70% blood oxygen saturation, as indicating that a typical user is likely incapacitated by hypoxemia when blood oxygen saturation of that user, including blood oxygen saturation in a cranial vessel such as a branch of a carotid artery, has fallen below 70%; however, data gathered regarding a particular user may indicate that the particular user is only likely to be incapacitated at 65% blood oxygen saturation and/or that the particular user is likely to be incapacitated at 75% blood oxygen saturation, and threshold may be modified in memory accordingly.

Still referring to FIGS. 3-7, in an embodiment, a single physiological parameter and/or combination of physiological parameters may be associated with a plurality of thresholds indicating a plurality of degrees of physiological conditions, such as degrees of incapacitation. As a non-limiting example, a plurality of thresholds may be stored regarding blood oxygen saturation, such as without limitation a first threshold indicating a possible saturation problem, a second indicating a degree of blood oxygen saturation consistent with some degree of performance degradation on the part of the user, and a third threshold indicating that incapacitation is likely. By way of illustration, and without limitation, default or factory-set thresholds may include a first threshold triggered upon a user crossing into 80-90% blood oxygen saturation, indicating "saturation possible problem," a second threshold upon the user crossing into 70-80% saturation, indicating "Performance degraded," and a third threshold upon the user crossing into <70% saturation indicating "incapacitation likely," while 90-100% saturation may indicate a normal amount of blood oxygen saturation. Generally, multiple thresholds may be set just above physiologically-relevant levels corresponding to onset of symptoms, cognitive impairment, and total incapacitation for a very-accurate, user-specific warning tone. User-specific thresholds at any tier or degree of incapacitation may be set and/or adjusted according to an iterative process, where users define thresholds, and/or the system finds user thresholds based on, as a non-limiting example, user-specific training and/or sortie data. Determination that of a physiological state may alternatively or additionally be performed without a threshold comparison, for instance by identifying a correlation of two or more sensor data determined, for instance using machine learning as described below, to be associated with entry into such one or more physiological states; as a non-limiting example, detection of imminent incapacitation and/or unconsciousness due to hypoxemia may be accomplished by detecting a simultaneous or temporally correlated increase in heart rate and decrease in blood oxygen saturation. Combinations or associations of sensor data may further involve measuring several human performance metrics including SPO2, Pulse Rate, and full plethysmograph as well as environmental sensor data such as flight conditions for full characterization and correlation of human performance in flight, for instance as described in further detail below.

Still referring to FIGS. 3-7, detection of physiological state may include comparing at least a physiological parameter to at least a baseline value and detecting the physiological state as a function of the comparison. At least a baseline value may include a number or set of numbers representing normal or optimal function of user, a number or set of numbers representing abnormal or suboptimal function of user, and/or a number or set of numbers indicating one or more physiological parameters demonstrating a physiological state. At least a baseline value may include at least a threshold as described above. In an embodiment, at least a baseline value may include a typical user value for one or more physiological parameters. For example, and without limitation, at least a baseline value may include a blood oxygen level, blood pressure level, pulse rate, or other circulatory parameter, or range thereof, consistent with normal or alert function in a typical user; at least a baseline value may alternatively or additionally include one or more such values or ranges consistent with loss of consciousness or impending loss of consciousness in a typical user. Similarly, at least a baseline value may include a range of neural oscillations typically associated in users with wakeful or alert states of consciousness, and/or a range of neural oscillations typically associated with sleeping or near-sleeping states, loss of consciousness or the like. Processor 320 may receive a typical user value and using the typical user value as the baseline value; for instance, processor 320 may have typical user value entered into memory of processor 320 by a user or may receive typical user value over a network or from another device. At least a baseline value may be maintained in any suitable data structure, including a table, database, linked list, hash table, or the like.

Continuing to refer to FIGS. 3-7, typical user value may include a user value matched to one or more demographic facts about user. For instance, a pulse rate associated with loss of consciousness in women may not be associated with loss of consciousness in men, or vice-versa; where user is a woman, the former pulse rate may be used as a baseline value for pulse rate. Baseline value may similarly be selected using a typical value for persons matching user's age, sex, height, weight, degree of physical fitness, physical test scores, ethnicity, diet, or any other suitable parameter. Typical user baseline value may be generated by averaging or otherwise aggregating baseline values calculated per user as described below; for instance, where each user has baseline values established by collection of physiological parameters using devices such as device 100, such values may be collected, sorted according to one or more demographic facts, and aggregated to produce a typical user baseline value to apply to user. Still referring to FIGS. 3-7, baseline value may be created by collection and analysis of at least a physiological parameter; collection and/or analysis may be performed by processor 320 and/or another device in communication with processor 320. For instance, receiving a baseline value may include collecting a plurality of samples of the at least a physiological parameter and calculating the baseline value as a function of the plurality of samples. Device 300 may continuously or periodically read or sample signals from at least a physiological sensor 316, recording the results; such results may be timestamped or otherwise co-associated, such that patterns concerning physiological parameters may be preserved, detected, and/or analyzed. For example and without limitation, user pulse rate and/or blood pressure may vary in a consistent manner with blood oxygen level; user blood pressure and/or pulse rate may further vary in a consistent manner with brain wave activity. Additional information from other sensors may similarly collected to form baseline value; for instance, where user is operating a machine, such as an aircraft, data concerning operation, such as flight control data, may be collected and associated with at least a physiological parameter. As a non-limiting example, user's reaction time when operating an aircraft may be measurably slower when user's blood pressure is below a certain amount, while showing no particular change for variations in blood pressure above that amount. Additional information may further be provided by user and/or another person evaluation user behavior and/or performance. For example, during test flights or other operation of an aircraft where user and/or aircraft may be observed, user, a supervisor, or another observer may record information such as the user's performance, the user's feelings or apparent state of health, the performance of the aircraft, and the like. Some factors that may be relatively objectively monitored regarding the overall state of health experience by the user may include how many times the user has to use "anti-G" breathing exercises, or similar activities. In an embodiment, data is received from user and/or observers via numerical ratings, or selections of buttons or other entry devices that map to numerical ratings. Alternatively or additionally, entries may be formed using one or more text entries; text entries may be mapped to numerical ratings or the like using, as a non-limiting example, natural language analysis, textual vector analysis, or the like. Plurality of physiological parameters and/or user entries and other entries may be collected over time, during, for instance a series of routine activities by user.

Continuing to refer to FIGS. 3-7, baseline value may be generated by collection of data from at least an environmental sensor 324. For instance, each set of one or more physiological parameters taken at a particular moment, or over a particular period of time, may be linked in memory to one or more environmental parameters, including without limitation motion-sensor data, air quality data, and the like. This may be used by device 300, as a non-limiting example, to collect relationships between environmental parameters and physiological parameters, such as a relationship between localized or systemic blood pressure, G-forces, and state of consciousness of a user in an aircraft, or a relationship between quality of neural oscillations and external water pressure in a diver. This in turn may be used to produce additional baseline information as described in further detail below. As further examples, relationships determined to achieve baseline values may include comparisons of heart rate, heart rate increase and heart rate recovery are easily compared to scientifically derived norms established in academia and professional athletics. Relationships may include correlation of blood oxygen saturation, heart rate and heart rate variability. These metrics may be useful for objectively determining deliberate risk levels associated with human performance, for instance using population data and/or machine learning as described in further detail below. In an embodiment, a baseline study of each individual performance against known conditions, such as in the Restricted Oxygen Breathing Device, may be performed prior to use of device 10; a purpose of the baseline evaluation may be to assess how each individual responds to specific conditions. Such a response may be used to both validate the data to draw usable conclusions, as well as to calibrate the system, for instance by setting and/or adjusting default threshold levels as described above.

With continued reference to FIGS. 3-7, plurality of physiological parameters, plurality of environmental parameters, and/or user-entered data may be aggregated, either independently or jointly. For instance, device 300 may calculate an average level, for one or more parameters of at least a physiological parameter, associated with normal or optimal function, health, or performance of user; a standard deviation from the average may also be calculated. Threshold amount may be determined based on amounts by which a typical user may deviate from average amount before experiencing a marked change in physiological state. Threshold amount may be set as some multiple of standard deviations, as calculated from sensed physiological parameters; for instance, 5% to 50% of a standard deviation from an average value for a given detected physiological parameter.

With continued reference to FIGS. 3-7, processor may determine physiological state according to at least a continuum, a range, or spectra. Accordingly, physiological state may be a quantitative or qualitative indication of a user's physiological state. In some cases, physiological state may be a proportional value, for example a number between 0 and 1. In some cases, physiological state may have a numeric unit of meaningful or arbitrary units. In some cases, physiological state may have a discrete or categorical value, for example without limitation "asleep," "awake," "hungry," "tired," "focused," "distracted," and the like.

Alternatively or additionally, and still referring to FIGS. 3-7, aggregation may include aggregation of relationships between two or more parameters. For instance, and without limitation, aggregation may calculate a relationship between a first physiological parameter of the at least a physiological parameter and a second physiological parameter of the at least a physiological parameter; this relationship may be calculated, as a non-limiting example, by selecting a first parameter as a parameter associated with a desired state for the user and a second parameter known or suspected to have an effect on the first parameter. For example, first parameter may be blood oxygen level, and second parameter may be blood pressure, such as localized blood pressure in a cranial region; a reduction in cranial blood pressure may be determined to be related to a reduction in cranial blood oxygen level, which in turn may be related to loss of consciousness or other loss of function in user or in a typical user. As another example, aggregation may calculate a relationship between a physiological parameter of the at least a physiological parameter and an environmental parameter. For example, blood oxygen level may be inversely related to an amount of acceleration or G force a user is experiencing in an aircraft; this relationship may be directly calculated from those two values, or indirectly calculated by associating the amount of acceleration or G force with a degree of decrease in cranial blood pressure, which may then be related to blood oxygen levels. Aggregation may calculate a relationship between at least a physiological parameter and user-entered data; for instance, people observing user may note losses of performance or apparent function at times associated with a certain degree of decrease in blood oxygen level or some other physiological parameter. The relationships may be between combinations of parameters: for instance, loss of function may be associated with an increase in G forces coupled with a decrease in pulse rate, or a decrease in blood oxygen coupled with a decrease in alpha waves, or the like.

Still referring to FIGS. 3-7, relationships between two or more of any of physiological parameters, environmental parameters, and/or user-entered parameters may be determined by one or more machine-learning algorithms. A "machine learning process" or "machine-learning algorithm," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Machine learning may function by measuring a difference between predicted answers or outputs and goal answers or outputs representing ideal or "real-world" outcomes the other processes are intended to approximate. Predicted answers or outputs may be produced by an initial or intermediate version of the process to be generated, which process may be modified as a result of the difference between predicted answers or outputs and goal answers or outputs. Initial processes to be improved may be created by a programmer or user or may be generated according to a given machine-learning algorithm using data initially available. Inputs and goal outputs may be provided in two data sets from which the machine learning algorithm may derive the above-described calculations; for instance, a first set of inputs and corresponding goal outputs may be provided and used to create a mathematical relationship between inputs and outputs that forms a basis of an initial or intermediate process, and which may be tested against further provided inputs and goal outputs. Data sets representing inputs and corresponding goal outputs may be continuously updated with additional data; machine-learning process may continue to learn from additional data produced when machine learning process analyzes outputs of "live" processes produced by machine-learning processes. As a non-limiting example, an unsupervised machine-learning algorithm may be performed on training sets describing co-occurrences of any or all parameters in time; unsupervised machine-learning algorithm may calculate relationships between parameters and such co-occurrences. This may produce an ability to predict a likely change in a physiological parameter as a function of introduced changes in environmental noise and/or active noise reduction; thus, the physiological parameter may be affected in a predictable manner by changes in active noise reduction, for example as controlled by processor. For instance, in some user's selectively passing a component of environmental noise will yield a predictable change in a physiological parameter or state. In some cases, a relationship between active noise reduction parameters and physiological state may not be know a priori or easily inferred from literature or study. In these cases, machine-learning processes may be used to correlate different active noise reduction parameters with corresponding physiological parameters. In some cases, correlation between active noise reduction parameters and physiological parameters may be found using data from many users. Alternatively or additionally, in some cases, user-specific correlation between active noise reduction parameters and physiological parameters may be meaningfully ascertained when using data only from a single user.

With continued reference to FIGS. 3-7, a supervised machine learning algorithm may be used to determine an association between one or more active noise reduction parameters, environmental noises, noise-reducing signals and one or more physiological parameters, or other outcomes or situations of interest or concern. For instance, a supervised machine-learning algorithm may be used to determine a relationship between one or more sets of parameters, such as active noise reduction parameters, environmental noise, or noise-reducing signal and physiological parameters, environmental parameters, and/or user-entered information. To illustrate, a mathematical relationship between a set of active noise reduction and environmental parameters, such as noise-reducing signal and environmental noises as described above, and physiological parameters, may be detected by a supervised machine-learning process; such a process may include a linear regression process, for instance, where a linear combination of parameters may be assumed to be associated with a noise-reducing signal and collected parameter data and associated data describing the physiological parameters are evaluated to determine the linear combination by minimizing an error function relating outcomes of the linear combination and the real-world data. Polynomial regression may alternatively assume one or more polynomial functions of parameters and perform a similar minimization process. Alternatively or additionally neural net-based algorithms or the like may be used to determine the relationship.

Still viewing FIGS. 3-7, each of the above processes for aggregation and/or machine learning may further be compared to test data, such as data gathered concerning user physiological parameters, performance, and/or function, in one or more testing facilities or protocols; such facilities or protocols may include, for instance, centrifuge testing of a user's response to acceleration and/or G forces, tests administered to monitor one or more physiological parameters and/or user function or performance under various adverse conditions such as sleep deprivation, boredom, and the like, or any other tests administered to determine the effect of various conditions on user and/or correlate physiological parameters to physiological state. Such test data may be collected using device 300, or alternatively may be collected using one or more other devices, medical facilities, and the like. Any aggregation and/or machine learning as described above may be applied to test data, independently or combined with other data gathered as described above; for instance, in an embodiment, test data may be combined with typical user data to achieve a first baseline, which may be compared to further data gathered as described above to modify the baseline and generate a second baseline using any suitable aggregation or machine-learning methodology. Collected and/or aggregated data may be provided to users, such as supervisors or commanders, who may use collected and/or aggregated data to monitor state of health of individual users or groups of users. In an embodiment, device 300 may store data collected during a period of activity, such as a flight where device 300 is used with a pilot and may provide such data to another device upon completion of the period of activity. For instance, device 300 may download stored data into a file for storage and tracking; data file may be analyzed using an indigenously designed application to determine areas of further study, allowing a detailed look at portions of ground operations or flight in which physiological responses can be compared to known conditions. File and/or collected data may be transferred to a remote computing device via network, wired, or wireless communication; for instance, and without limitation, device 300 may be connected to or placed in communication with remote device after each flight or other period of activity. Where device 300 is incorporated in an element of headgear such as a helmet, headset, and/or mask, such element of headgear may be connected via wired, wireless, and/or network connection to remote device.

Still viewing FIGS. 3-7, processor 320 may incorporate or be in communication with at least a user-signaling device 336. In an embodiment, at least a user-signaling device 336 may be incorporated in device 300; for instance, at least a user-signaling device 336 may be attached to or incorporated in housing 304. Where at least a user-signaling device 336 contacts an exterior body surface of user, housing 304 may act to place at least a user-signaling device 336 in contact exterior body surface of user. Alternatively or additionally, device 300 may communicate with a user-signaling device 336 that is not incorporated in device 300, such as a display, headset, or other device provided by a third party or the like, which may be in communication with processor 320. User-signaling device 336 may be or incorporate a device for communication with an additional user-signaling device such as a vehicle display and/or helmet avionics; for instance, user-signaling device 336 may include a wireless transmitter or transponder in communication with such additional devices. In an embodiment, and without limitation, user-signaling device 128 may be configured to indicate the degree of pilot hypoxemia to at least a user, as described in further detail below.

Continuing to refer to FIGS. 3-7, at least a user-signaling device 336 may include any device capable of transmitting an audible, tactile or visual signal to a user when triggered to do so by processor 320. In an embodiment, and as a non-limiting example, at least a user-signaling device 336 may include a bone-conducting transducer in vibrational contact with a bone beneath the exterior body surface. A bone-conducting transducer, as used herein, is a device or component that converts an electric signal to a vibrational signal that travels through bone placed in contact with the device or component to an inner ear of user, which interprets the vibration as an audible signal. Bone-conducting transducer may include, for instance, a piezoelectric element, which may be similar to the piezoelectric element found in speakers or headphones, which converts an electric signal into vibrations. In an embodiment, bone-conducting transducer may be mounted to housing 304 in a position placing it in contact with a user's bone; for instance, where housing 304 includes or is incorporated in an ear cup, housing 304 may place bone-conducting transducer in contact with user's skull just behind the ear, over the sternocleidomastoid muscle. Likewise, where housing 304 includes a headset, mask, or helmet, housing 304 may place bone-conducting transducer in contact with a portion of user's skull that is adjacent to or covered by headset, mask, or helmet. In some cases, bone-conducting transducer may be employed to capture at least one of a physiological parameter from a user, for example without limitation speech/breath cadence, or an environmental parameter, for example without limitation, environmental noise.

Referring again to FIG. 1, system 100 may be used in any number of applications. A few exemplary application use cases are provided below by way of non-limiting examples. In some cases, system 100 may be used by vehicle operators. As described above, white noise may be beneficial for sleep, for instance white-noise may out irregular or distracting sounds. Sleep and sleepiness are undesirable physiological states for users in some environments for example, users who are flying a plane or driving a car. However, many vehicles generate steady, monotonous (i.e., white) noise, which vehicle operator is subjected to too and may make the operator sleepy. Regular active noise cancellation may decrease white noise, by cancelling the white noise. However, plain silence may have similar affects on cognitive state, as does white noise; for example, silence can help induce sleep and sleepiness, too. Therefore, in some cases, system 100 may monitor and adapt to a particular user to maximize their performance, for instance staving off sleepiness.

Still referring to FIG. 1, system 100 may be used for remote learning. Many people report listening to music or other aural stimuli when reading or studying. Additionally, listeners to online lectures more effectively understand or capture conveyed information from the lecture better when the audio of the lecture is varied over the course of the lecture, for example by regular breaks or changes in the speaker's voice, environment, or background music/noise, as opposed to the same lecture given in a silent room. Students listening to online learning content may benefit from variable lecture audio by using a system 100 with adaptive active noise reduction. In some cases, as a user begins to lose focus or interest and physiologically "tunes out", the system 100 may change a listening environment, inject or subtract certain wavelengths of sound, or introduce stimuli to reengage the user, for example without altering content being delivered. In some additionally cases, system 100 may be used to autonomously optimize each learning scenario for each user.

Still referring to FIG. 1, in some cases, system 100 may be used for test preparation. System 100 may control an audio environment for short periods of highly productive studying or memorization periods. In further embodiments, system 100 may be used to determine when productive learning is likely or unlikely, through analysis of at least a physiological characteristic.

Still referring to FIG. 1, in some cases, system 100 may be used to determine a user's suitability for stressful work, for example during a scheduling or hiring process. System 100 may be used to compare a single user against his own baseline to determine a suitability for duty in a stressful environment. In some cases, system 100 may be used within a stressful environment; alternatively or additionally, system 100 may be used to induce a stressful environment through user through audio, which may be controlled according to sensed physiological characteristics to induce stress. Additionally, in some cases, system 100 may be used to compare a random sampling of users against a demographically similar baseline to determine an individual user's potential versus a similar peer group.

Figure 10:
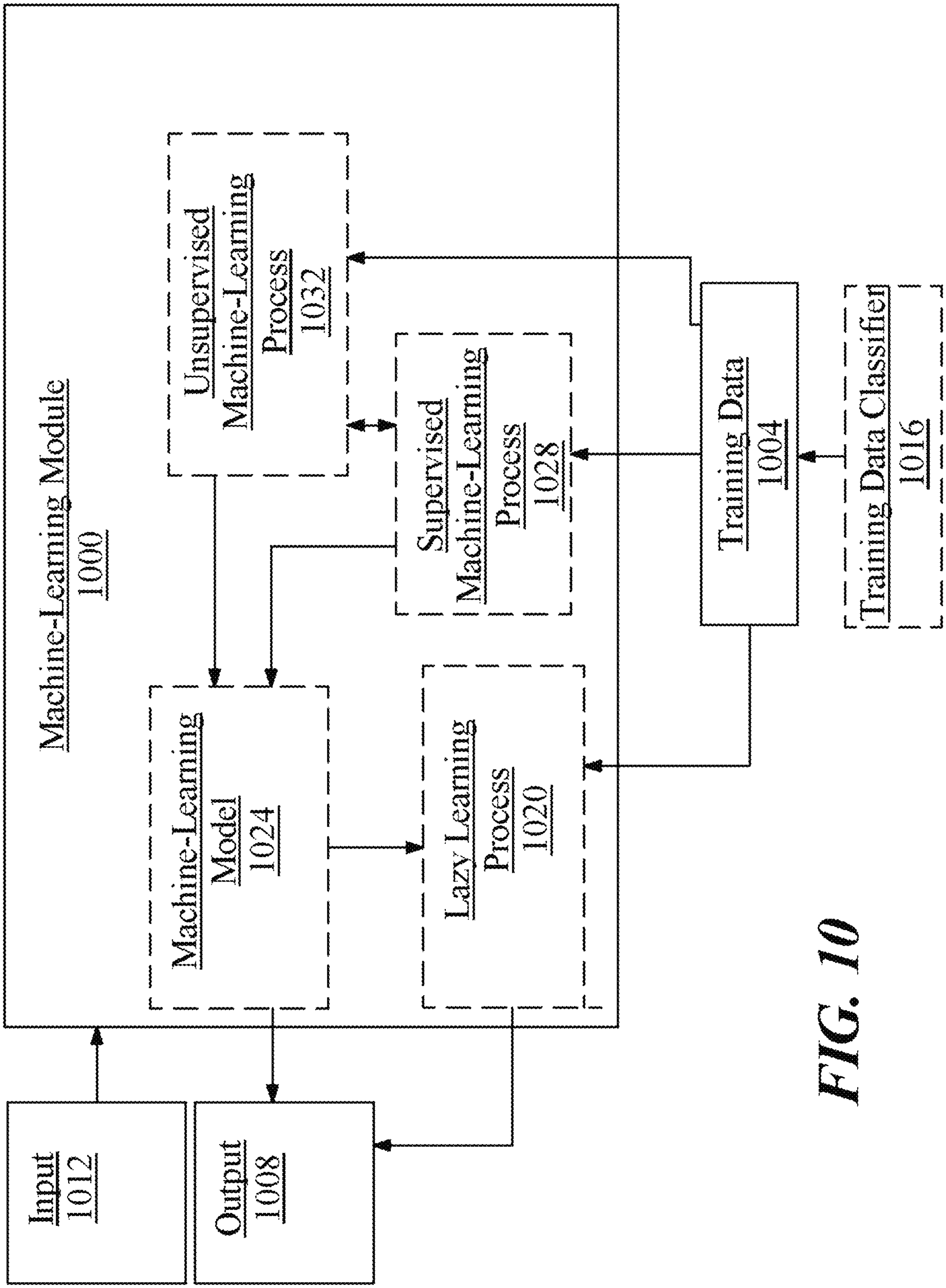
FIG. 10 is a block diagram of an exemplary machine-learning process.

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example, training data may correlate physiological signals or changes of physiological signals to auditory stimuli.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1016 may classify elements of training data to classify components of sound or environmental noise. For instance, in some cases, components of sound may be classified according to their physiological effects on a listener. Alternatively or additionally, in another case, components of sound may be classified according to a type, category, or origin of sound, for example without limitation components of sound could be classified as social noise, urban noise, machinery noise, laughter, and the like.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include physiological signals representative of physiological characteristics as described above as inputs, audio signals, such as without limitation noise-reducing signals, as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1028 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
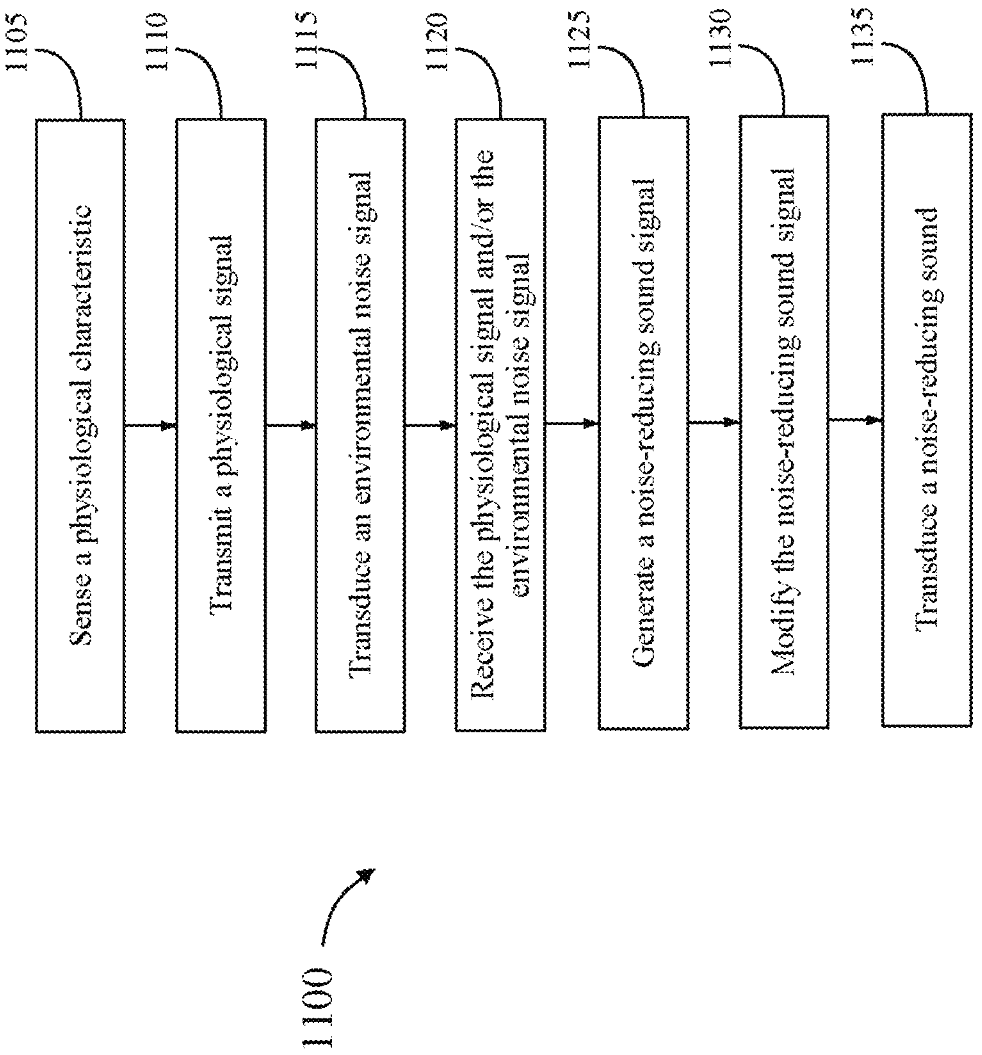
FIG. 11 is a flow diagram illustrating an exemplary method of dynamic active noise reduction.

Referring now to FIG. 11, an exemplary method 1100 of dynamic active noise reduction is illustrated in a flow diagram. At step 1105, a sensor senses a physiological characteristic of a user. Sensor may include any sensor described in this disclosure, for example in reference to FIGS. 1-10. A physiological characteristic may include any physiological characteristic, parameter, condition, and/or state described in this disclosure, for example in reference to FIGS. 1-10. At step 1110, sensor transmits a physiological signal correlated to physiological characteristic. Physiological signal may include any signal in this disclosure, such as those related and/or correlated to a physiological characteristic, for example in reference to FIGS. 1-10. In some cases, sensor comprises a near-infrared spectroscope. In some cases, sensor comprises a respiration sensor.

With continued reference to FIG. 11, at step 1115, at least a microphone transduces an environmental noise to at least an environmental noise signal. Microphone may include any microphone described in this disclosure, for example in reference to FIGS. 1-10. Environmental noise may include any noise described in this disclosure, for example in reference to FIGS. 1-10. Environmental noise signal may include any signal described in this disclosure, for example in reference to FIGS. 1-10.

With continued reference to FIG. 11, at step 1120, a processor receives physiological signal and/or environmental noise signal. Processor may include any processor or computing device described in this disclosure, for example in reference to FIGS. 1-10. At step 1125, processor generates a noise-reducing sound signal as a function of environmental noise signal. Noise-reducing sound signal may include any signal described in this disclosure, for example in reference to FIGS. 1-10. At step 1130, processor modifies noise-reducing sound signal as a function of physiological signal. Processor may modify noise-reducing sound signal according to any signal modification, analysis, filtering, modulating, and/or controlling methods described in this disclosure, for example in reference to FIGS. 1-10. In some embodiments, method may additionally include modifying, using a processor, noise-reducing sound signal to selectively pass a component of environmental noise. In some versions, component of environmental noise may have a pass-through frequency. In some cases, method may additionally include selecting, using processor, pass-through frequency as a function of the physiological signal. In some versions, component of environmental noise may have a pass-through volume. In some cases, method may additionally include selecting, using processor, pass-through volume as a function of physiological signal. In some embodiments, method may additionally include processor generating an artificial environmental noise signal as a function of the physiological signal; and the processor augmenting noise-reducing sound signal with the artificial environmental noise signal.

With continued reference to FIG. 11, at step 1130, a speaker transduces a noise-reducing sound from the modified noise-reducing sound signal. Speaker may include any speaker described in this disclosure, for example in reference to FIGS. 1-10.

Still referring to FIG. 11, in some embodiments, method additionally includes: an environmental sensor sensing an environmental characteristic; the environmental sensor transmitting an environmental signal correlating to the environmental characteristic; processor receiving the environmental signal; and the processor modifying noise-reducing sound signal as a function of physiological signal and the environmental signal.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
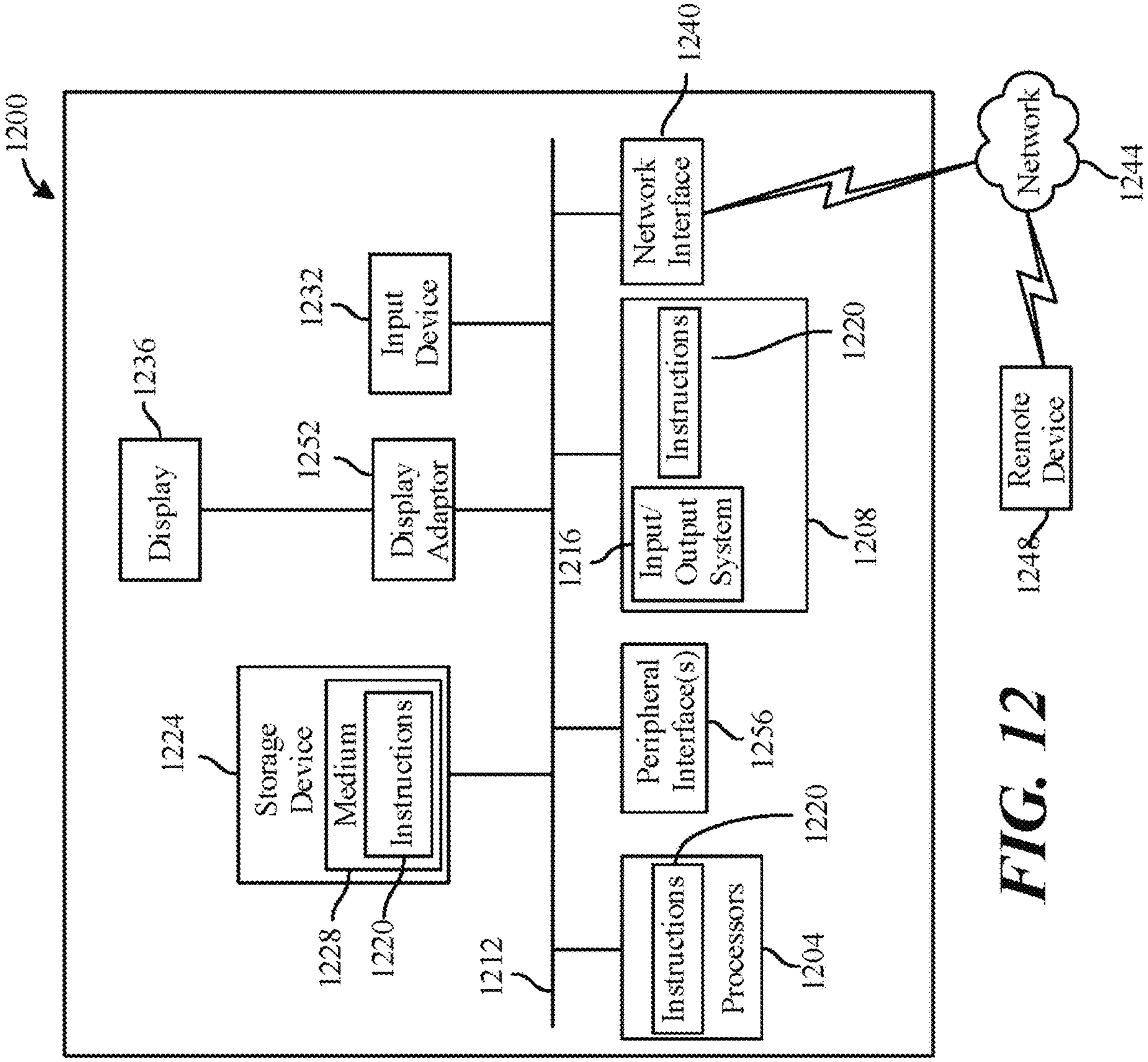
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for dynamic active noise reduction comprising:
- at least a physiological sensor configured to:
  - sense a physiological characteristic of a user; and
  - transmit a physiological signal correlated to the sensed physiological characteristic;
- at least an environmental microphone configured to transduce an environmental noise to an environmental noise signal;
- a processor configured to:
  - receive the environmental noise signal;
  - correlate at least a component of the environmental noise signal to a physiological parameter of a plurality of physiological parameters of the user, wherein the physiological parameter comprises an arousal response;
  - generate a noise-reducing sound signal as a function of the environmental noise signal; and
  - modify the noise-reducing sound signal as a function of the physiological signal and the arousal response, wherein modifying the noise reducing sound signal comprises modifying the noise-reducing sound signal to selectively pass through an impulsive sound of the environmental noise; and
- a speaker configured to transduce a noise-reducing sound from the modified noise-reducing sound signal.

2. The system of claim 1, wherein modifying the noise-reducing sound signal to selectively pass through an impulsive sound of the environmental noise comprises adjusting a parameter of the impulsive sound.

3. The system of claim 2, wherein the parameter of the impulsive sound comprises a frequency of the impulsive sound.

4. The system of claim 2, wherein the parameter of the impulsive sound comprises a volume of the impulsive sound.

5. The system of claim 1, wherein the arousal response comprises a cranial blood oxygenation.

6. The system of claim 1, wherein modifying the noise-reducing sound signal comprises altering the perceived location of the impulsive sound in the environmental noise signal.

7. The system of claim 1, wherein modifying the noise-reducing sound signal comprises altering the perceived location of a sound in the environmental noise signal.

8. The system of claim 1, wherein:

the processor is further configured to determine a physiological state, wherein determining the physiological state comprises comparing the physiological parameter to a threshold level; and modifying the noise-reducing sound signal comprises modifying the noise-reducing sound signal as a function of the physiological state.

9. The system of claim 1, wherein the at least a physiological sensor comprises a respiration sensor.

10. The system of claim 1, wherein the at least a physiological sensor comprises an electromyographic sensor.

11. A method of dynamic active noise reduction comprising:

sensing, using at least a physiological sensor, a physiological characteristic of a user;

transmitting, using the at least a physiological sensor, a physiological signal correlated to the sensed physiological characteristic;

transducing, using at least an environmental microphone, an environmental noise to an environmental noise signal;

receiving, using a processor, the environmental noise signal;

correlating, using the processor, at least a component of the environmental noise signal to a physiological parameter of a plurality of physiological parameters of the user, wherein the physiological parameter comprises an arousal response;

generating, using the processor, a noise-reducing sound signal as a function of the environmental noise signal;

modifying, using the processor, the noise-reducing sound signal as a function of the physiological signal and the arousal response, wherein modifying the noise reducing sound signal comprises modifying the noise-reducing sound signal to selectively pass through an impulsive sound of the environmental noise; and transducing, using a speaker, a noise-reducing sound from the modified noise-reducing sound signal.

12. The method of claim 11, wherein modifying the noise-reducing sound signal to selectively pass through an impulsive sound of the environmental noise comprises adjusting a parameter of the impulsive sound.

13. The method of claim 12, wherein the parameter of the impulsive sound comprises a frequency of the impulsive sound.

14. The method of claim 12, wherein the parameter of the impulsive sound comprises a volume of the impulsive sound.

15. The method of claim 11, wherein the arousal response comprises a cranial blood oxygenation.

16. The method of claim 11, wherein modifying the noise-reducing sound signal comprises altering the perceived location of a sound in the environmental noise signal.

17. The method of claim 11, wherein modifying the noise-reducing sound signal comprises altering the perceived location of a sound in the environmental noise signal.

18. The method of claim 11, further comprising determining, by the processor, a physiological state, wherein determining the physiological state comprises comparing the physiological parameter to a threshold level and wherein modifying the noise-reducing sound signal comprises modifying the noise-reducing sound signal as a function of the physiological state.

19. The method of claim 11, wherein the at least a physiological sensor comprises a respiration sensor.

20. The method of claim 11, wherein the at least a physiological sensor comprises an electromyographic sensor.

* * * * *